United States Patent
Weaver et al.

(10) Patent No.: US 11,651,363 B2
(45) Date of Patent: May 16, 2023

(54) ANONYMOUS FUNDING OF AN ONLINE ACCOUNT WITH CASH

(71) Applicant: Pilot Games, Inc., Minnetonka, MN (US)

(72) Inventors: Jon Weaver, Saint Paul, MN (US); Warren R. White, Reno, NV (US); Anthony M. Morelli, Mt. Pleasant, MI (US)

(73) Assignee: PILOT GAMES, INC., Minnetonka, MN (US)

( * ) Notice: Subject to any disclaimer, the term of this patent is extended or adjusted under 35 U.S.C. 154(b) by 152 days.

(21) Appl. No.: 16/995,540

(22) Filed: Aug. 17, 2020

(65) Prior Publication Data

US 2021/0374727 A1    Dec. 2, 2021

Related U.S. Application Data

(60) Provisional application No. 62/704,830, filed on May 29, 2020.

(51) Int. Cl.
| | | |
|---|---|---|
| *G06Q 20/38* | (2012.01) | |
| *G07F 17/32* | (2006.01) | |
| *G06Q 20/20* | (2012.01) | |
| *G06Q 20/32* | (2012.01) | |

(52) U.S. Cl.
CPC ........... *G06Q 20/383* (2013.01); *G06Q 20/20* (2013.01); *G06Q 20/3224* (2013.01); *G07F 17/3223* (2013.01); *G07F 17/3244* (2013.01)

(58) Field of Classification Search
None
See application file for complete search history.

(56) References Cited

U.S. PATENT DOCUMENTS

| | | |
|---|---|---|
| 2001/0012796 A1 | 8/2001 | Walker et al. |
| 2017/0092076 A1* | 3/2017 | Anderson ........... G07F 17/3288 |
| 2017/0193748 A1 | 7/2017 | Arnone et al. |
| 2018/0293834 A1 | 10/2018 | Cage et al. |
| 2022/0076225 A1* | 3/2022 | Yatagiri ............... G06Q 20/108 |

* cited by examiner

*Primary Examiner* — Neha Patel
*Assistant Examiner* — Nicholas K Phan
(74) *Attorney, Agent, or Firm* — Kerr IP Group, LLC

(57) ABSTRACT

A system and method for anonymously funding a temporary cash account is described. The system includes a personal mobile device, a cash account, a Point-of-Sale (POS) device and a network component. A device identifier is received by the personal mobile device. A unique session identification is generated by the network component and communicated to the personal mobile device and to the POS device. The POS device and personal mobile device displays the device identifier. The POS device then proceeds to receive a cash amount. The POS receives an instruction to associate the cash amount with the personal mobile device. The personal mobile device communicates the cash amount to the network component. The network component receives the device identifier, the unique session identification and the cash amount. The network component funds the cash account with the cash amount. The personal mobile device accesses the cash account to fund an activity.

16 Claims, 13 Drawing Sheets

ANONYMOUS FUNDING OF AN ONLINE ACCOUNT WITH CASH

CROSS REFERENCE

This patent application claims the benefit of provisional patent application 62/704,830 filed on May 29, 2020, which is entitled ANONYMOUS FUNDING OF A TEMPORARY ONLINE ACCOUNT WITH A CASH FOR A WAGERING GAME.

FIELD

A system and method for anonymous funding of a temporary online account with cash for a wagering game at an authorized location is described. More particularly, the online account is funded with cash that is received by a point of sale device and the online account is accessible using a downloaded application disposed on a mobile device.

BACKGROUND

Typical wagering devices include slot machines and video lottery terminals and are normally managed by various types of computer systems which monitor and control their activities. Such wagering devices are typically located in casinos, racetracks, tribal gaming locations, fraternal organizations, lottery outlets or other authorized locations. These are generally capital-intensive operations requiring a significant capital expenditure.

Wagering system have been developed where a central computer system is interconnected via one or more of a variety communication mechanisms to a multiplicity of venues where wagering devices, such as VLTs or slot machines, allow players to play via the insertion of cash or equivalent into the machines. The information associated with the wagering devices is transmitted to the central computer, which provides security monitoring and accounting services. Many varieties of such systems exist.

The wagering devices may operate as stand-alone wagering devices, in which the wagering activity and prize awards are handled principally by the retail device, e.g. slot machine, and the central system is tasked with monitoring and reporting activities associated with the retail device. Other stand-alone wagering devices are more highly integrated with the central system, in which the central system performs some or all of the game play and the retail device reflects the wagering results determined by the central system.

Typically, the traditional wagering devices in the retail venues are proprietary devices that incorporate coin and or currency accepting devices. In some instances, the wagering devices may include credit or debit card readers, although that is prohibited by law and/or regulation in many jurisdictions.

More recently, central systems have been developed that use commercial digital tablets or similar mobile devices that are configured and operated at a particular venue. These mobile devices do not have coin or currency readers. Instead the mobile devices operate in conjunction with a cashier operated point-of-sale (POS) device, or a kiosk. In operation, a cashier will accept funds from a person that desires to use an application on the tablet and the cashier uses functions on the POS device to fund a temporary account that is tied to a particular venue's mobile device; the mobile device is then loaned to the user. Regretfully, these central systems do not support anonymously funding a player account with cash for a wagering game operating on personal mobile device, e.g. smartphones that belong to the customer.

In some jurisdictions systems exist that allow personal mobile devices, e.g. smartphones, to be used as a wagering device that operates wagering games in various on-line configurations. Generally, the process of funding the wagering game is performed with a registered user account, in which the user provides personal identification information, and funds the account through the use of personal credit or debit card accounts. In existing systems anonymous cash transactions cannot be used to fund an anonymous cash account for a wagering game that operates on a personal mobile device. In such systems there is typically no requirement that wagering be performed in a licensed venue.

Secure anonymous transactions may also be performed with a one-time anonymous card account. However, these systems cannot, again, support cash transactions.

Because there are circumstances whereby users of an application would prefer to pay for it anonymously, it would be beneficial to provide a system and method to support the anonymous funding of an online account with cash for a wagering game, or other application, operating on a personal mobile device.

SUMMARY

A system for anonymously funding a temporary cash account is described. The system includes a personal mobile device, a cash account, a Point-of-Sale (POS) device and a network component. The personal mobile device is communicatively coupled to a network component. The cash account has a predefined duration period. The cash account forfeits funds remaining in the cash account upon expiration of the predefined duration period. The Point-of-Sale (POS) device is also communicatively coupled to the network component. The POS device is associated with an authorized or licensed location.

A personal mobile device is identified as being in an authorized location, as specified by a database associated with the network component. If the mobile device is not in an authorized location, it may be sent information describing the location of nearby authorized locations.

If the mobile device is in an authorized location, the network component will determine a device identifier value that is unique to the specific authorized location. The network component may create the device identifier or the network component may have a screen-name suggested by the mobile device as entered by the user, in which case the network component would validate that the suggested device identification is unique at the authorized location. The device identifier value is sent from the network component to the personal mobile device and the POS at the authorized location.

A unique session identification value is generated by the network component. The unique session identification is communicated to the personal mobile device. The unique session identification generated by the network component is also communicated to the POS device. This unique session identification value is incorporated in all data messages between the mobile device, POS and the network component for integrity verification.

The POS device displays the device identifier. The device identifier is also displayed on the personal mobile device.

The POS device then proceeds to receive a cash amount from a particular user of the personal mobile device. The POS device generates a confirmation instruction that confirms that the device identifier associated with the personal mobile device is in the possession of the particular user that provided the cash amount. The POS receives an instruction to associate the cash amount with the personal mobile device that shares the same device identifier with the personal mobile device and the POS device. The POS device communicates the device identifier, the unique session identification and the cash amount to the network component. The personal mobile device communicates the cash amount to the network component.

The network component receives the device identifier, the unique session identification and the cash amount. The network component verifies the data and funds the cash account specified by the session identification with the cash amount. The personal mobile device accesses the cash account to fund an activity.

By way of example and not of limitation, the illustrative device identifier originates at the personal mobile device and is communicated to the network component. Additionally, the device identifier originating from the personal mobile device may be generated from a user input.

In one embodiment, the system includes a mobile application that is downloaded to the personal mobile device, in which the downloaded mobile application is communicatively coupled to the network component. The mobile application requests a geo-location data set and the mobile application communicates the geo-location data set to the network component. In another illustrative embodiment, the network component receives a Wi-Fi source message from the mobile application, in which the Wi-Fi source message is associated with an authorized location. The network component accesses a database that identifies authorized locations.

In another illustrative system, a cash selection input is associated with the mobile application. The cash selection input is received by the mobile application, which is then communicated to the network component that communicates the cash selection input to the POS device.

In various embodiments, the mobile application that includes a wagering game operating on the personal mobile device and the cash account funds the wagering game. The mobile application may also receive the device identifier and the mobile application receives the unique session identification. The mobile application may also display the device identifier with a large image of the device identifier when the personal mobile device is in the same authorized location as the POS device.

A method for anonymously funding a temporary cash account is also described. The method includes communicatively coupling a personal mobile device to a network component. The method proceeds by providing a cash account that has a predefined duration period, in which the cash account forfeits funds remaining in the cash account upon expiration of the predefined duration period. The method communicatively couples a Point-of-Sale (POS) device to the network component, in which the POS device is associated with at least one authorized location.

The personal mobile device and POS device receives a device identifier from the network component. The device identifier may originate at the personal mobile device and is communicated to the network component. The device identifier may be generated from a user input.

The method proceeds to generate a unique session identification, at the network component, that is communicated to the personal mobile device. The unique session identification, generated by the network component, is also communicated to the POS device.

The method then displays the device identifier on the POS device. The method also displays the device identifier on the personal mobile device when the personal mobile device is in the same authorized location as the POS device.

A cash amount is then received at the POS device from a particular user. The POS device then proceeds to generate a confirmation instruction that confirms that the device identifier associated with the personal mobile device is in the physical possession of the particular user that provided the cash amount. An instruction is received, at the POS, that associates the cash amount with the personal mobile device sharing the same device identifier with the personal mobile device and the POS device. The cash amount from the personal mobile device is communicated to the network component.

The network component then proceeds to receive the device identifier, the unique session identification and the cash amount. The cash account is funded, at the network component, with the cash amount. The personal mobile device then accesses the cash account to fund an activity.

In one illustrative embodiment, the method includes downloading a mobile application to the personal mobile device, in which the downloaded mobile application is communicatively coupled to the network component. The mobile application requests a geo-location data set that is communicated from the mobile application to the network component. The network component then communicates a list of authorized gaming locations to the mobile application.

In another embodiment, the method includes a cash selection input associated with the mobile application, in which the cash selection input is received by the mobile application and communicated to the network component, which then communicates the cash selection input to the POS device.

In yet another embodiment, the mobile application displays the device identifier with a large image of the device identifier when the personal mobile device is in the same authorized location as the POS device.

FIGURES

The illustrative embodiments may be more fully understood by reference to the following drawings which are for illustrative, not limiting, purposes.

DESCRIPTION

Figure 1A:
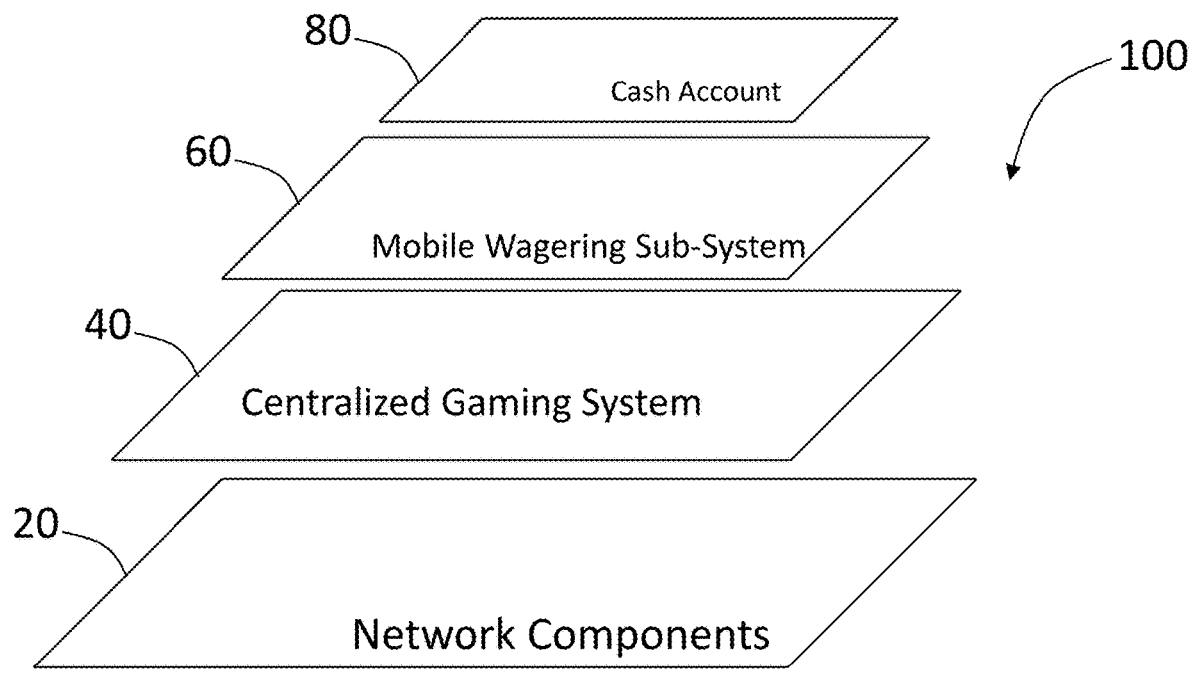
FIGS. 1A and 1B shows an illustrative gaming system that includes a layer of network components, a centralized gaming system, a mobile wagering sub-system and a cash account.

Persons of ordinary skill in the art will realize that the following description is illustrative and not in any way limiting. Other embodiments of the claimed subject matter will readily suggest themselves to such skilled persons having the benefit of this disclosure. The various illustrative embodiments will now be described more fully with reference to the accompanying drawings. It should be understood that this disclosure and the claims may be embodied in many different forms and should not be construed as limited to the embodiments set forth herein. Additionally, those familiar with computing systems shall appreciate that there are many variants possible for the described systems, depending on the nature of the available networks, legal frameworks, which can open or restrict the types of locations in which the system can be operated, advances in server and networking technologies, etc.

The system and method presented herein supports the anonymous funding of an online account with cash that is received by a Point-of-Sale (POS) device. In the illustrative embodiment, a mobile application operating on a patron's personal mobile device communicates with the POS device disposed at a gaming venue. The POS device receives cash from the patron and the cash is used to fund an online account. For purposes of this patent, the online account is also referred to as a "cash account" because the online account is seeded with cash that is received by the POS device. In the illustrative embodiment, the anonymous cash account may be associated with a wagering game that operates on the patron's personal mobile device.

The gaming systems and methods presented herein include a mobile wagering system that is designed to be used in wagering applications within legal gaming frameworks. More specifically, the gaming systems and methods presented herein support centralized control of wagering that takes place in multiple wagering venues, which may also be referred to as a "gaming venue."

The illustrative authorized location is a gaming venue that includes a charity, a lottery outlet, a casino and any other such authorized or licensed gaming venue. Additionally, a gaming venue includes a church, service club, hotel, bar, restaurant, convenience store and other such locations that support licensed gaming activity. Note, that the term "gaming" refers to games of chance or games that include a chance component, in which a wager is received, and the awarded prize is dependent on the outcome of the game of chance or of the chance component. For example, in some cases, each gaming venue may be associated with a sponsoring organization, e.g. a charity, and/or an additional business entity, e.g. a distributor. The types of venues, sponsoring organizations and other business entities will vary according jurisdictional statutes and regulation.

As described in further detail herein, the gaming system and method includes a Mobile Wagering Sub-system (MWS). The gaming system is communicatively coupled to a plurality of remote gaming venues, in which each remote gaming venue has at least one mobile client device that supports customer wagering. Additionally, each remote gaming venue may include one or more Point-of-Sale stations that manage player funds. In the illustrative embodiments presented herein, the various elements of the gaming system are communicatively and operatively coupled to one another with a network structure that includes the Internet as the backbone and at least one secure Wi-Fi network within each gaming venue.

Figure 1B:
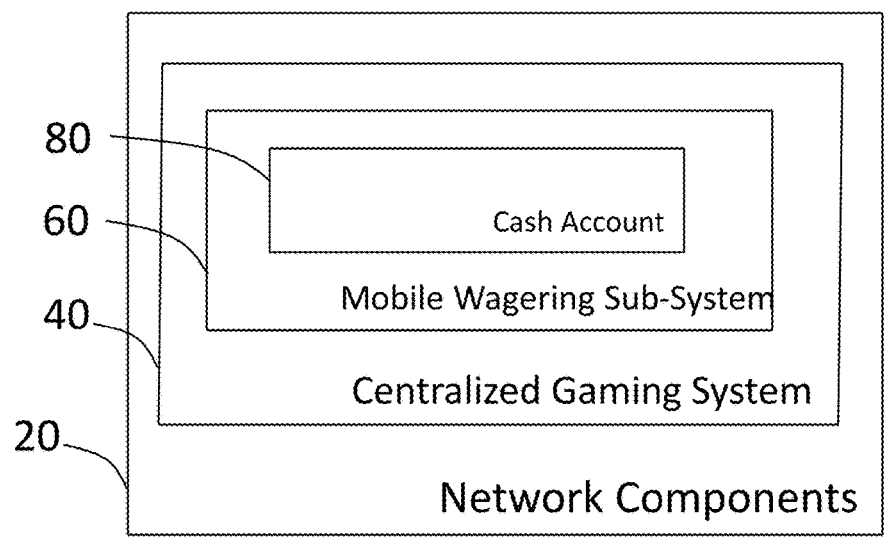

Referring to FIGS. 1A and 1B there is shown an illustrative gaming system that includes a layer of network components, a centralized gaming system, a mobile wagering sub-system and a cash account. Computer network components or network components 20 refers to the hardware components of a computer network. By way of example and not of limitation, the network components may include the hardware components of a Local Area Network or a secure Wide Area Network. Network components may include servers, software, modems, routers, switches, hubs, Network Interface Cards (NICs), wireless access points, firewalls, internet appliances, databases and other such computer hardware.

In the illustrative embodiment, the servers may be communicatively coupled to a Wide Area Network, e.g. Internet. The network communications between the network components may operate as a single network, a distributed network, a hierarchical network or other network design. The network components can support sever virtualization, virtual machines, containers, containerization, and other such computing environments.

Network components receive and transmit data packets to other network components or to client devices. For example, a network component may include a server that includes a list of authorized gaming locations and another network component may store mobile gaming content for a mobile application.

The illustrative network components 20 provide the hardware that supports the central gaming system 40. The illustrative mobile wagering sub-system 60 controls and manages the mobile wagering activities that are associated with the central gaming system 40. The illustrative cash account 80 is controlled and managed by the mobile wagering sub-system 60.

Thus, the network component 20 provides the computer hardware components which support the central gaming 40. The mobile wagering sub-system 60 is a software component or module of the central gaming system 40. The cash account 80 that is seeded anonymously, as described herein, is a further sub-component or sub-module of the mobile wagering sub-system 60.

Figure 1C:
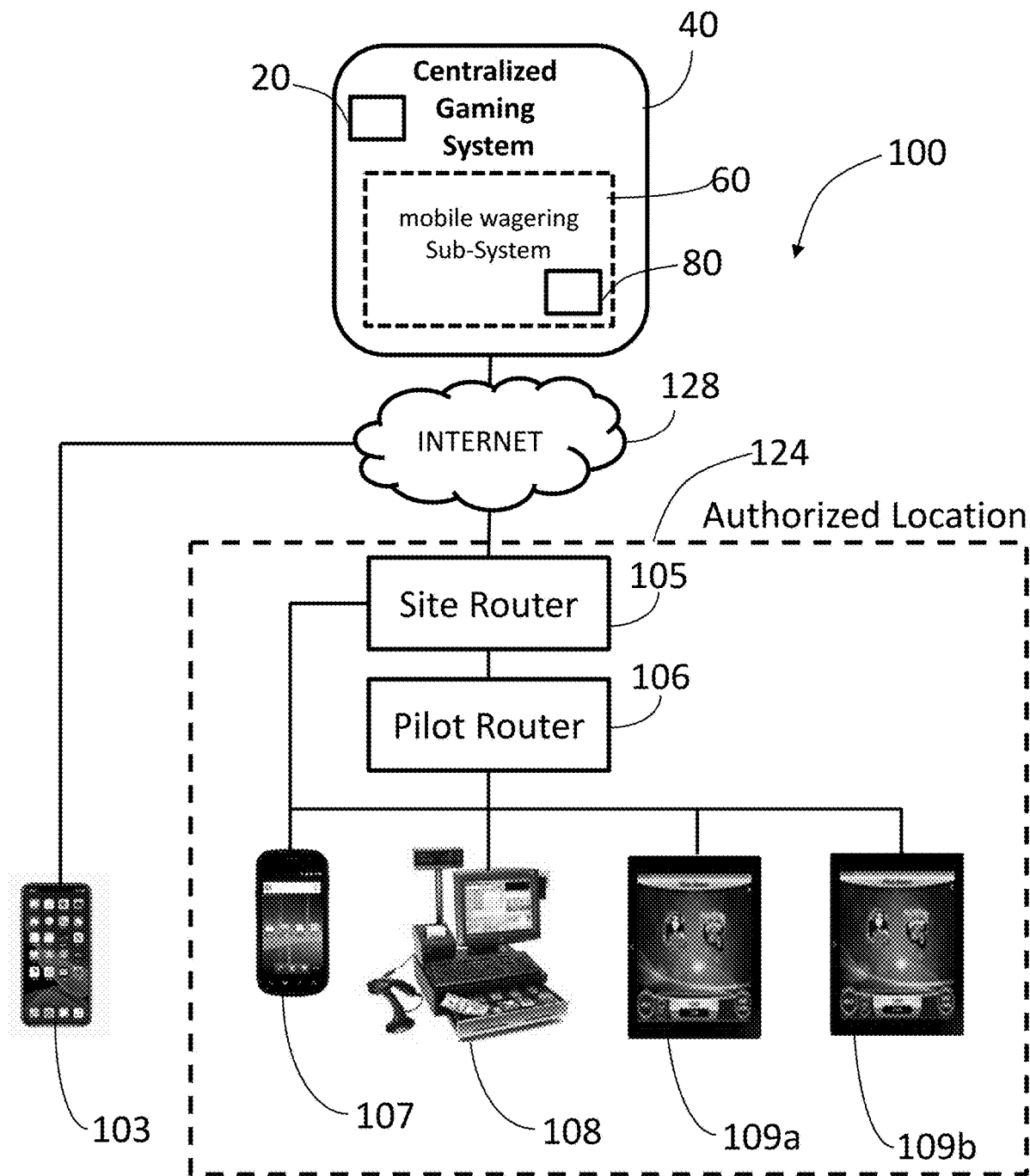
FIG. 1C shows an expanded view of the illustrative gaming system that includes other client devices.

Referring to FIG. 1C, there is shown a more detailed view of the gaming system 100 for anonymously funding a temporary cash account. The illustrative gaming system 100 includes a personal mobile device 107, a cash account 80 associated with the mobile wagering sub-system 60, a Point-of-Sale (POS) device 108 and a network component 20 associated with a centralized gaming system 40. The personal mobile device 107 is communicatively coupled to the network component 20 because the personal mobile device 107 is recognized as within the authorized location 124. In some embodiments the cash account can be shared with the centralized gaming system.

The cash account 80 has a predefined duration period. In the illustrative embodiment, the cash account 80 forfeits funds upon user termination of a session or expiration of the predefined duration period. The Point-of-Sale (POS) device 108 is also communicatively coupled to the network component 20. The POS device is associated with an authorized location 124.

More specifically, the centralized gaming system 40 includes one or more network components 20 such as a multiplicity of servers that are communicatively coupled to one another. The illustrative network components, e.g. servers, are associated with the mobile wagering sub-system 60. In the illustrative embodiment, the mobile wagering sub-system 60 operates with network components, e.g. servers, that may be physical or logical devices in a virtual array in a cloud configuration. By way of example and not of limitation, servers are communicatively coupled to a Wide Area Network 128, e.g. Internet, which is communicatively coupled to a plurality of gaming venues, namely, authorized location 124.

In the illustrative embodiment, the gaming venue associated with the authorized location 124 includes a plurality of authorized mobile devices 109a and 109b respectively. Further still, the illustrative gaming venue includes a Point-of-Sale (POS) device 108. The illustrative authorized mobile devices 109 and the POS devices 108 are client devices configured to communicate with each other and the mobile wagering sub-system 60.

In operation, the authorized mobile devices 109 and POS devices 108 are registered with the mobile wagering sub-system 40, which includes a database (not shown) that associates the authorized mobile devices 109 and POS devices 108 with a designated authorized location 124. The authorized mobile devices 109 and POS devices 108 have been pre-configured to communicate with the mobile wagering sub-system 60. Authorized mobile devices 109 and POS devices 108 do not communicate with the centralized gaming system 40 when the client devices are not located at the authorized location 124. Illustrative authorized mobile devices 109 include, but are not limited to, tablet devices or other such wireless devices.

Within authorized location 124, the personal mobile device 107 includes smartphones or tablets, such as an iOS device 103 or an Android device 107, which are not pre-configured to communicate with the mobile wagering sub-system 60. The personal mobile devices 103 and 107 may interact with the system if they are properly loaded with an appropriate mobile application program that identifies the personal mobile device as being within an authorized location 124. The personal mobile device 107 is converted to an authorized mobile devices when the mobile application program identifies the personal mobile device as being within the authorized location 124.

However, personal mobile device 103 is outside of the authorized location 124 so the personal mobile device 103 is not operating as an authorized device; thus, communications from the non-authorized personal mobile device 103 with the centralized gaming system 40 are limited.

The illustrative authorized mobile devices 109 and 107 operate as wireless client devices that are communicatively coupled to the centralized gaming system 40 because the authorized mobile devices are within the authorized location 124. Note, the POS device 108 may also operate as an authorized device. The authorized mobile personal device 107 can interact with the centralized gaming system 40 because the mobile personal device is in an authorized location 124 venue.

Additionally, the centralized gaming system 40 may be communicatively coupled to non-mobile clients, i.e. fixed client devices, within the authorized locations 124. The non-mobile clients disposed in the gaming venues and communicatively coupled to the centralized gaming system 40 include, but are not limited to, wired devices such as gaming machines, slot machines, PCs, stationary monitors, Internet appliances, Internet of Things (IoT) devices and other such non-mobile devices with hardwire connections or wireless connections to the Wide Area Network 128. The non-mobile client devices may be configured to participate in the games associated with the mobile wagering sub-system 60.

The authorized mobile client devices 107 and 109 comply with the system-centric wagering requirements in which determination of all wagering results and accounting activity are controlled by the mobile wagering sub-system 60 and have the communications infrastructure, directly or by proxy, to interact with the central gaming system 40. The central gaming system 40 includes a plurality of server applications that are configured to provide high-availability and redundancy, process all inputs and generates outputs.

By way of example and not of limitation, the centralized gaming system 40 includes three different types of network communications. Firstly, there are network communications between the one or more network components 20 and the corresponding mobile wagering sub-system 60. Secondly, there are network communications between the network components 20 and the authorized locations 124 having the illustrative remote gaming venues. Thirdly, there are network communications within the gaming venues with the personal mobile device 107, the POS 108 and the authorized mobile devices 109.

Communication within authorized location 124 is facilitated by one or more routers 105 and 106. These routers provide wired and/or wireless Wi-Fi services between the external network 128 and authorized devices 107, 108 and 109 within the authorized location 124. These routers can be configured in a variety of ways depending on regulatory and security requirements. In general, the Wi-Fi routers may communicate a Wi-Fi source message such as a Wi-Fi SSID. In one embodiment, the site router 105 provides a Wi-Fi SSID which provides generalized services to a variety of services unrelated to the wagering system. It may also include a wired connection to router 106, which provides a second Wi-Fi SSID which is only dedicated to the wagering system. Other embodiments allow bridging between the routers. In yet another embodiment, a dedicated communication server (not shown) is provided to provide additional network security for wagering functions.

In operation, when the authorized mobile device is in an authorized location, the network component 20 determines a device identifier value that is unique to the specific authorized location. The illustrative network component 20 may create the device identifier or it may have a screen-name suggested by the application on the mobile device as entered by the user, in which case the network component would validate that the suggested device identifier value is unique at the authorized location. The determined device identifier value is sent to the mobile device and the POS at the authorized location as described herein.

With respect to network communications between the network components, the illustrative network components may operate as a single network, in which the network components can communicate with one another using service requests. By way of example and not of limitation, the illustrative network components have two internet protocol addresses, namely, a Private IP used to maintain the server network and ensuring secure server-to-server communication, and a Public IP that is bound to the Internet and that provides access to server services through high security communications such as HTTPS. The network components use their private IPs for server-to-server communication so that these services are not exposed to the Internet, the game application running on the authorized mobile devices and the POS devices.

By way of example and not of limitation, each server is configured with an SSL certificate which supports HTTPS calls. The illustrative server is configured to forward some requests it receives through HTTPS to a local port, and the requests that are allowed to pass are only those available to authorized "Game" and "POS" devices. This illustrative configuration ensures that only very specific requests are allowed from the public IP. By way of example and not of limitation, the illustrative servers operate using the Linux operating system and Restful programming techniques that include Java as the programming language with Jersey RS support. Database structures are contained in a MySQL database. Communication between the server components, and the remote client devices is performed over a wide-area network 128. As described above, these network communications are performed using secure SSL communications over the Internet.

Figure 2:
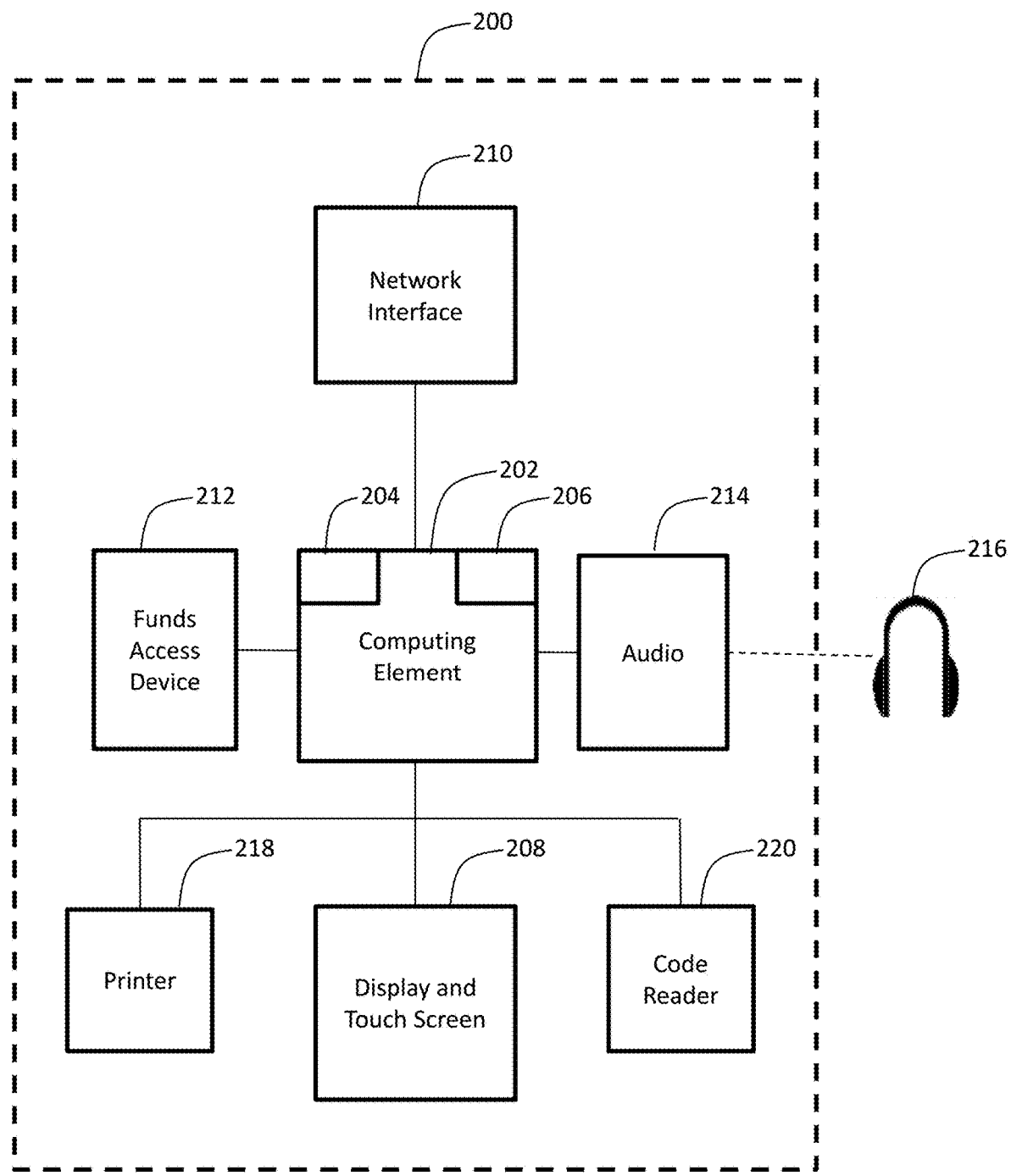
FIG. 2 shows an illustrative authorized an illustrative player interface unit, which may be embodied as either authorized mobile device mobile device or point-of-sale (POS) device.

For purposes of this patent application, the authorized mobile devices 109 and authorized personal mobile devices 107 may also referred to as a "player interface unit," which are described in further detail in FIG. 2.

A player account (not shown) is associated with each of the authorized mobile devices 109 and 107. By way of example and not of limitation, the player account is described as a short-term, anonymous entity tied to the client device being used by the player, and which expires when the fund balance drops to zero. However, it is possible in other embodiments to have non-financial player accounts which may exist for longer time periods and be tied to a player.

Additionally, it should be noted that while the illustrative embodiments presented herein generally describe financial transactions such as adding funds or cashing out at the POS device 108, in different regulatory environments or with different technology, such player accounts can have financial transactions originating at the player device or any other client device that may be configured to support POS transaction. Furthermore, the financial transactions may be supported at a system level with a network component or server module that provides a web portal functions for financial transactions. Thus, the financial transactions may be performed by the client device, a network component, a server module, or any combination thereof. Depending on regulatory issues and available technology, financial transactions may be based on cash, credit cards, debit cards, digital currency or other mediums of finance.

Referring now to FIG. 2 and FIG. 1, there is shown an illustrative player interface unit 200, which may be embodied as either authorized mobile device 109, authorized point-of-sale device 208, authorized personal mobile device 107, non-authorized personal mobile device 103, or any combination thereof.

The illustrative player interface unit 200 includes a central computing element 202 with a processor 204 and memory storage 206. In one illustrative embodiment, the authorized mobile device 109 may include a pre-installed software module that is associated with the authorized location 124. The pre-installed software module may include game title files stored on remote network components that support a mobile application, i.e. a mobile "app" store.

In one illustrative embodiment, and the player interface unit 200 downloads a mobile application that includes one or more game title files, run one or more game title files and enable the user to interact with the corresponding game title. In another illustrative embodiment, a mobile application is downloaded to the personal mobile device 107 and the mobile application enables the personal mobile device 107 to be communicatively coupled to at least one network component 20 associated with the centralized gaming system 40.

In the illustrative embodiment, the mobile application includes a wagering game operating on the personal mobile device and the cash account 80 funds the wagering game. The mobile application may also receive the device identifier, e.g. screen name, and the mobile application receives the unique session identification value. The mobile application may also display the device identifier with a large image of the device identifier when the personal mobile device is near the POS device.

The unique session identification value is generated by the network component, which communicates the unique session identifier to the personal mobile device 107 and POS device 108. The unique session identification value is incorporated in all data messages between the mobile device, POS device and the network component for integrity verification.

In operation, the mobile application requests a geo-location data set from the personal mobile device 107 such as information about a local Wi-Fi access point. The illustrative mobile application then proceeds to communicate the geo-location data set to the network component 20. The geo-location data set that is communicated to the network component 20 is used to determine if the personal mobile device 107 is within an authorized location 124. The illustrative network component 20 accesses a database (not shown) that includes a list of authorized locations for the anonymous funding of an online account with cash.

By way of example and not of limitation, the database may include Wi-Fi access point information that is used in conjunction with, or instead of, geo-location data to identify authorized locations 124. If data available to the network component confirms that the data received from a personal mobile device 107 originates from an authorized Wi-Fi access point matching one of the authorized locations, then the personal mobile device 107 is within an authorized location 124. For example, the network component may receive a Wi-Fi source message from the mobile application, in which the Wi-Fi source message is associated with an authorized location.

The player interface unit 200 includes a color display with a touch-screen 208 and a network interface component 210, which provides network access to a local area network, a wide area network or any combination thereof. By way of example and not of limitation, the network interface component supports a wireless local area network such as a Wi-Fi network, which is based on IEEE 802.11 standards. Additionally, the authorized mobile device 200 may communicate with the wide area network 128 via the illustrative Wi-Fi network. The communication between the authorized mobile device 200 and the mobile wagering sub-system 60 may be performed using the illustrative HTTPS protocol or other such secure networking protocol that allows game session inputs, commands and outputs to be communicated securely across the Wide Area Network.

In an illustrative embodiment, the player interface device 200 may be converted to an authorized mobile device 200 when the player interface device 200 is within an authorized location 124. In the illustrative embodiment, the authorized mobile device 200 is a tablet computing devices running iOS or Android operating systems. The illustrative authorized mobile device 200 may also include a Funds Access Device module 212 that may be configured to have a custom locked profile to evade security-bypassing attempts. The Funds Access Devices (FAD) 212 may also provide alternative methods for starting play sessions or adding funds to existing sessions. By way of example and not of limitation, the Funds Access Device module 212 may include currency readers and debit/credit card readers such as a magnetic stripe reader, a smart-card reader, an infra-red reader, a Near-Field-Communications reader and other such financial transaction readers.

The illustrative authorized mobile device 200 may also include an audio system component 214 that enhances the game-playing experience for the players. The audio system component 214 may also include a standard audio jack or Bluetooth interface so that player can use wired or wireless headphones 216 to improve the game audio environment without disturbing others.

In one illustrative embodiment, the authorized mobile device 200 may include a printer 218 and a code reader 220. By way of example and not of limitation, the printer 218 generates vouchers. The illustrative code reader 220 may be embodied as a bar-code reader that is configured to read vouchers generated by the printer.

By way of example and not of limitation, the authorized mobile device 200 may be configured to include a "HELP" button in the game client that also dispatches a signal to the POS device 108 to notify the operator that the player is requesting assistance. The authorized mobile device 200 may also be configured to include a text-to-speech functionality to aid a visually impaired player. Additionally, the authorized mobile device 200 may include a gaming application that downloads files, decompresses the downloaded files if they have been compressed, and caches all assets inside the authorized mobile device 200. The authorized mobile device 200 supports dynamic updates without the need to update the game client itself.

Referring now to FIG. 1 and FIG. 2, the mobile wagering sub-system 60 associated with network component 20 are communicatively coupled to a plurality of authorized personal mobile device 107 or authorized mobile devices 109 such as illustrative player interface unit 200. In one illustrative embodiment, the mobile wagering sub-system 60 receives a wager input for a game session from an authorized mobile device 200. In another illustrative embodiment, the mobile wagering sub-system 60 receives the wager input for a game session from a plurality of authorized mobile devices 107 or 109, which may be disposed at a plurality of different authorized locations 124.

The illustrative authorized mobile device 200 presents a user interface on touch screen 208 that shows a plurality of game content associated with different types of game sessions. In the illustrative embodiment, the authorized mobile device 200 may also accept player inputs that are associated with a game session. The game session may perform various operations as described in further detail below.

Figure 3:
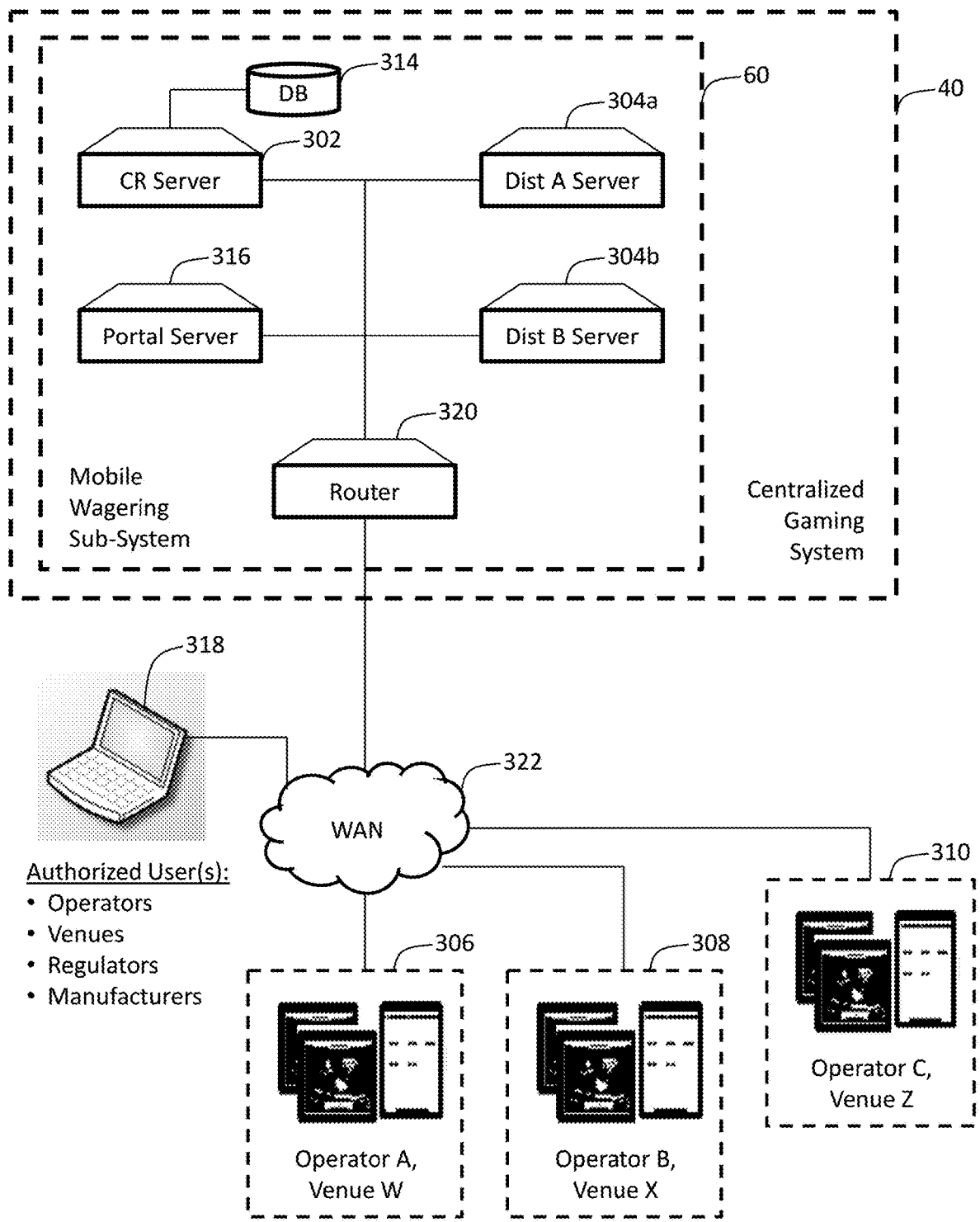
FIG. 3 shows further detail for the centralized gaming system that includes the mobile wagering sub-system, which is communicatively coupled to different venues.

Referring to FIG. 3, there is shown further detail for the centralized gaming system 40 that includes the mobile wagering sub-system 60, which is communicatively coupled to different venues. In an illustrative embodiment, the mobile wagering sub-system functionality is distributed between a plurality of different network components 20. The illustrative network components 20 includes servers 302, 304, 316, database 314 and router 320. The network components 20 provide the hardware that supports the mobile wagering sub-system 60.

In the illustrative embodiment, the mobile wagering sub-system 60 is communicatively coupled a centralized resource/manufacturer server 302 that performs as a coordinating entity for system operation and maintains authority over game operations controlled by the centralized gaming system 40. The mobile wagering sub-system 60 is also communicatively coupled to at least one distributor server 304 that is communicatively coupled to the centralized resource server 302.

In the illustrative embodiment presented in FIG. 3, a first distributor server 304a and second distributor server 304b are further communicatively to the centralized resource server 302. Each of the illustrative distributor servers 304 is configured to manage and control the game operations and cashier operations performed at a specified subset of the authorized locations. Distributor servers 304 may be associated with a distributor entity that is responsible for sales and support of a multiplicity of authorized locations, e.g. gaming venues.

For example, a first set of gaming venues 306 and 308 may be configured to communicate with first distributor server 304a, which manages and controls the game operations at gaming venues 306 and 308. Additionally, for a second gaming venue 310 communicates with the illustrative second distributor server 304b, which manages and controls the game operations at gaming venues 310. Additional gaming venues may require additional distributor servers. Network components 20 of the centralized gaming system 40 support a mobile wagering sub-system that is modular and scalable.

The centralized resource server 302 performs a variety of tasks including, but not limited to, providing a central routing operation for each of the authorized mobile devices 107, 108 or 109 (shown in FIG. 1) so that each authorized mobile device is routed to the proper distributor server 304a or 304b upon activation each authorized mobile device.

By way of example and not of limitation, the first request generated by an authorized mobile device 200 may direct the authorized mobile device 200 to an illustrative distributor server associate with authorized location 124. With respect to non-authorized personal device 103, the centralized resource server 302 validates the location of each mobile device before allowing it to operate as an authorized device 107.

Additionally, the centralized resource server 302 may be configured to provide a central routing operation for a cashier authentication corresponding to POS device 108. Thus, a POS device 108 may be authenticated by the appropriate distributor server 304, which may then forward to authentication to an appropriate distributor server 304.

The centralized resource server 302 may also be configured to operate as a central authority for generation of finite decks of predetermined electronic pull-tab results. It may also support processes which enable play of games involving multiple client devices on multiple distributors.

The centralized resource server 302 may also manage and control financial information with a centralized database 314, which stores data generated by the cashiers, authorized mobile devices, and the various gaming venues. The centralized database 314 provides a central repository for accounting data, game play data, system configuration data, and other such data types.

The illustrative distributor servers 304 are communicatively coupled to the centralized resource server 302. Each of the distributor servers 304 may be configured to manage finances for the player accounts that are associated with the authorized mobile devices. Additionally, the illustrative distributor servers 304 may be responsible for generating logs and reports required for the centralized reporting as well as for POS devices. Furthermore, the illustrative distributor servers 304 may be configured to manage game play operations, wagers and prizes. Further still, the illustrative distributor servers 304 may manage cashier operations including customer sales and redemptions. Further yet, the distributor servers 304 may be configured to maintain the financial status for the authorized mobile devices, including the actual credit balance on each player device.

In an alternative embodiment, the operations performed by the centralized resource server 302 and the distributor server 304 may be performed by a centralized resource software module (not shown) and a distributor software module (not shown) that may be associated with a client-server architecture, a distributed architecture, a peer-to-peer architecture, a hierarchical architecture, a "cloud" architecture or any combination thereof.

The mobile wagering sub-system 60 may also include an illustrative web portal server 316. The web portal server 316 provides a web interface to access system accounting, financial reporting and operational data, as well as to maintain and configure the system. The web portal server 316 is configured to support creating, editing and removing entities like distributors, operators, venues, cashiers, devices, game parameters and others as required. All actions performed on the portal 316 are logged for auditing purposes. This action log can be accessed on the portal 316 itself if the user has the appropriate system privileges.

By way of example and not of limitation, the web portal server may be accessed from personal computers or tablet devices 318 over the internet. Authorized users having "administrator" privileges may access system reports and controls based upon their operational needs and organizational affiliation. The web portal server 316 supports a variety of different authorized users having different roles with different levels of access to the mobile wagering sub-system 60. For example, the web portal server may be configured to support the following roles: regulator, manufacturer, distributor with access to multiple operators, operator with access to multiple venues, a particular venue, a particular cashier and other such preconfigured roles. Other roles and associated access privileges may be created as determined by regulatory and operational needs.

An illustrative router 320 also communicates with the mobile wagering sub-system 60. The router 320 is communicatively coupled to a wide area network 322, e.g. Internet, which is communicatively coupled to the various venues and authorized users. Additionally, the illustrative router 320 is communicatively coupled to the portal server 316, each distributor server 304 and the centralized resource server 302. The router 320 forwards data packets to the appropriate network component such as a server, a network, an internet appliance, a sub-system and other such network components. Additionally, the router 320 may include a firewall that supports secure communications with the mobile wagering sub-system 60.

Figure 4:
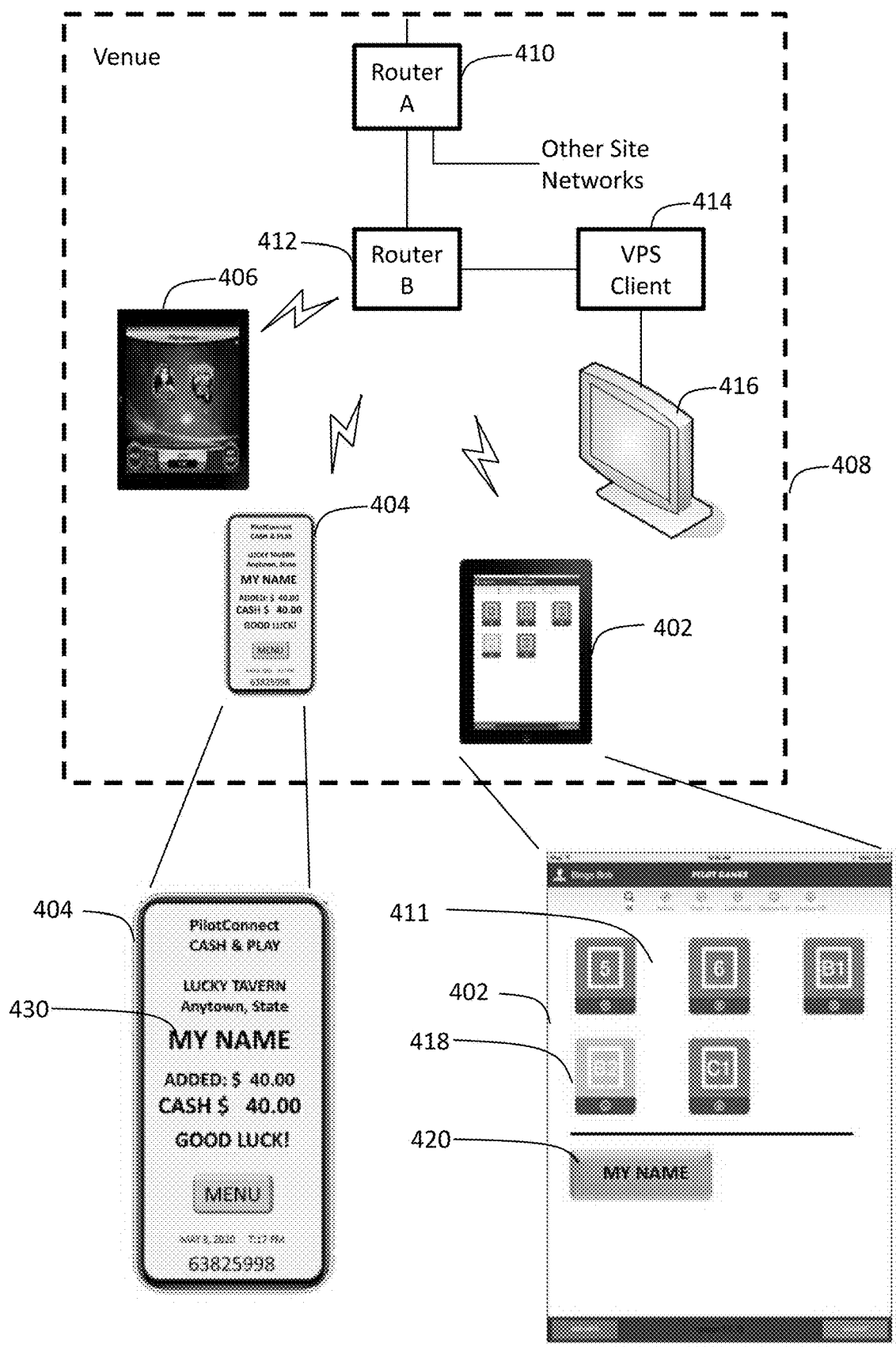
FIG. 4 shows an illustrative point-of-sale (POS) device communicatively coupled to authorized mobile devices in a gaming venue.

Referring now to FIG. 4, there is shown an illustrative point-of-sale (POS) device communicatively coupled to authorized mobile devices in a gaming venue. The illustrative POS device 402 is communicatively coupled to one or more authorized mobile devices 404 and 406 in gaming venue 408. By way of example and not of limitation, the illustrative POS device 402 is communicatively coupled to authorized mobile devices with a native Socket implementation inside a Local Area Network (LAN). An exploded view of an illustrative user interface 411 corresponding to POS device 402 is also shown.

The point-of-sale device 402 is configured to manage all cash operations such as cash-in operations and cash-out operations. The cash-in and cash-out operations may be requested by the authorized mobile device 404, the authorized mobile device 406, the POS 402 or any combination thereof. In the Illustrative embodiment, the POS device 402 is configured to receive a cash amount. The POS device 402 also receives an instruction to associate the cash amount with the personal mobile device 404 that shares the same device identifier with the personal mobile device 404 and the POS device 402. For example, in FIG. 4, the phrase "MY NAME" is presented as a device identifier on the mobile gaming device as item 430, and on the POS as item 420. The personal mobile device may then proceed to communicate the cash amount to the POS which initiates the funding transaction to the network component when the cash payment has been physical confirmed.

The POS device 402 generates a confirmation instruction that confirms that the device identifier associated with the personal mobile device is in the possession of the particular user that provided the cash amount. In operation, the POS device 402 receives an instruction to associate the cash amount with the personal mobile device that shares the same device identifier with the personal mobile device and the POS device. The POS device 402 communicates the device identifier, the unique session identification and the cash amount to the network component.

The illustrative point-of-sale (POS) device 402 and authorized mobile devices 404 and 406 may be embodied as a personal mobile devices 107 an authorized device 109, which are described above in FIG. 1. The illustrative POS device 402 is a client device configured to receive and operate a proprietary POS software component, e.g. a downloadable application.

The authorized mobile devices 404 and 406 are client devices configured to receive and operate a proprietary game application. The illustrative POS device 402 and authorized mobile devices 404 and 406 are communicatively coupled with the mobile wagering sub-system 60. In the illustrative embodiment, the client devices communicate with the mobile wagering sub-system 60 for each transaction. More generally, all wagering and accounting information is monitored and stored in the centralized gaming system 40 and the client devices reflect the information received from the centralized gaming system 40. For reasons of security and consistency all game play decisions and financial data is hosted in the centralized gaming system 40 and only visually reflected in the client devices.

The illustrative wide area network 128, e.g. Internet, (shown in FIG. 1) is communicatively coupled to the illustrative gaming venue 408, which is located within an authorized location 124. In the illustrative embodiment, the illustrative wide area network terminates at Router A 410. The illustrative Router A 410 may be a pre-existing router located at the venue 408 and usable for multiple purposes, depending on the needs of the venue. For example, Router A 410 may be a component of a cable TV system. In the illustrative embodiment, a second Router B 412 is also communicatively coupled to router A 410. Illustrative Router B 412 is configured to support the requirements for communications with the mobile wagering sub-stem 60. In some embodiments there may be a single router which performs the functions of Router A and Router B.

In the illustrative embodiment, router B 412 establishes two private Wi-Fi SSIDs to be used only at a specific site. Each Wi-Fi SSID includes a security key that is unique to that site and is not available to site personnel. One SSID may be used for the exclusive use of the mobile wagering system 60 and a second SSID may be provided for exclusive use pf other system applications.

The illustrative POS 402 computer is an electronic device that may be operated by a cashier in a venue. The POS device 402 provides control over financial activity within the venue. The illustrative POS Application program supports the following illustrative operations, namely, a cash-in operation (sales), a cash-out operation (redemption) and a reporting operation.

In the illustrative embodiment, the cashier logs into the POS application program by providing a cashier username and password. During the set-up process, the cashier name is associated with a cashier role that is associated only with a particular venue. After a successful login, the POS client retrieves relevant system information from an illustrative distributor server 304, which presents the user interface 411.

The illustrative user interface 411 associated with POS client 402 presents colored icons, in which each icon represents one of the authorized mobile devices (such as authorized mobile devices 404 and 406) in the venue 408. Note that the illustrative authorized mobile devices 404 and 406 may also be referred to as "a registered gaming client." By way of example, each icon 418 has a short identifier representing the local identification of the device, which is unique within that venue. For example, a grey icon may identify that the authorized mobile device has been registered with the mobile wagering sub-system; however, the authorized mobile device is not currently available for game play. Another illustrative icon may be a yellow icon, which represents that the authorized mobile device is present and available. A green icon may represent that the authorized mobile device has credit and is involved in a game session. A red icon may represent that a player input has been received that relates to a HELP button input command, a cash selection input command or a cash output command. When a personal mobile device 109 is identified in location 408, the POS will be notified by the network component 20 and the POS will display a new icon 420 which will represent the new device which will be identified with a display of the device identifier, as received from the network component.

In operation, a cashier interacts with the user interface 411 and selects an icon associated with a particular authorized mobile device. After selecting the appropriate authorized mobile device, the user interface enables the cashier to add cash to the authorized mobile device, to cash-out a player from the authorized mobile device, and to display a log of recent play and transactional activity and other operational functions as may be required in various implementations.

The add cash process may include a cash selection input that is associated with the mobile application operating on the personal mobile device 107. The cash selection input is received by the mobile application, which is then communicated to the network component associated with the mobile wagering sub-system 60, which communicates the cash selection input to the POS device.

The illustrative POS client 402 is communicatively coupled to centralized resource server 302, the distributor server 304 or any other such network components.

A variety of other user interfaces may also be presented on the POS device 402. For example, a user interface may be presented that allows the illustrative cashier to access reports and to log-out from the POS device 402. For example, a reports screen may be presented that summarizes the business activity of the current day, the previous day or a historical period. The reports may include data regarding cash-in sales (in dollars), awarded prizes (in US Dollars) and net revenue, which is the difference between the cash-in sales and the awarded prizes. The illustrative reports screen may be refreshed in real time or in pseudo real time.

Figure 5A:
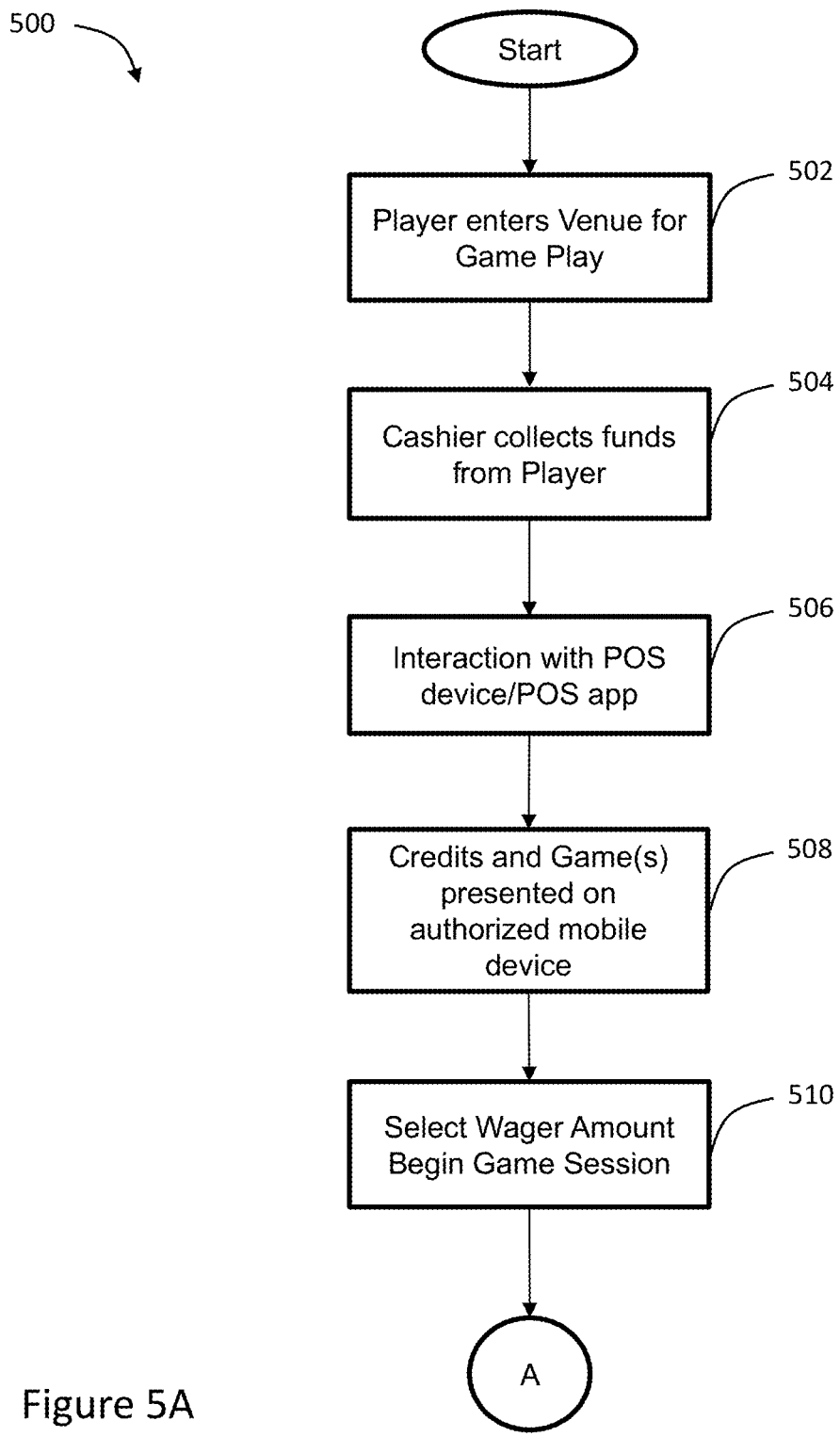
FIGS. 5A and 5B shows an illustrative method for anonymously funding a temporary cash account.

Referring to FIG. 5A, there is shown an illustrative method for anonymously funding a temporary cash account 80. The method describes the various steps performed by a player interacting with the gaming system 100. The illustrative centralized gaming method 500 is initiated at block 502 where an illustrative player enters one of the authorized locations 124 (shown in FIG. 1), e.g. a gaming venue, and indicates to the cashier or similar venue employee that the player wants to initiate game play with the gaming system 100.

The method then proceeds to block 504 where the cashier collects monetary funds such as cash, e-money, debit card, credit card and other such monetary funds as are appropriate depending on jurisdictional regulatory requirements.

At block 506, the illustrative cashier then proceeds to interface with a Point-Of Sale (POS) application on a device such as POS device 108 (shown in FIG. 1). In another embodiment, the player may interface with a kiosk version of the POS device 108 without the need to interact with a venue employee. In yet another embodiment, the POS application may be running on an authorized mobile device 212 and the player may interact directly with the POS application.

While interfacing with the POS device or POS application, at block 506, the illustrative cashier identifies the authorized mobile device 109 (shown in FIG. 1) associated with the player. The illustrative cashier then proceeds to enter the amount of credits to add to the authorized mobile devices. This amount of credits is stored in illustrative central database 314 (shown in FIG. 3).

At block 508, the total credits, which correspond to the collected funds, are presented on the authorized mobile device 109. The player may then interact with a game application running on the authorized mobile device. The player may also select from a variety of different game applications, which may be presented as a menu of games displayed on the authorized mobile device 109 screen. In operation, various game screens corresponding to the chosen game are presented to the player.

At block 510, the player can select a wager amount for a particular game session. In the illustrative embodiment, the wager amount includes the number of credits the player has selected to be wagered. Depending on jurisdictional requirements, wager amounts can be expressed in dollars and cents (or other local currency) or in terms of credits, where each unit of credit has a monetary value. By way of example and not of limitation, the player may then initiate the game session by pressing a PLAY button, which is an illustrative game input received by the authorized mobile device 109.

Figure 5B:
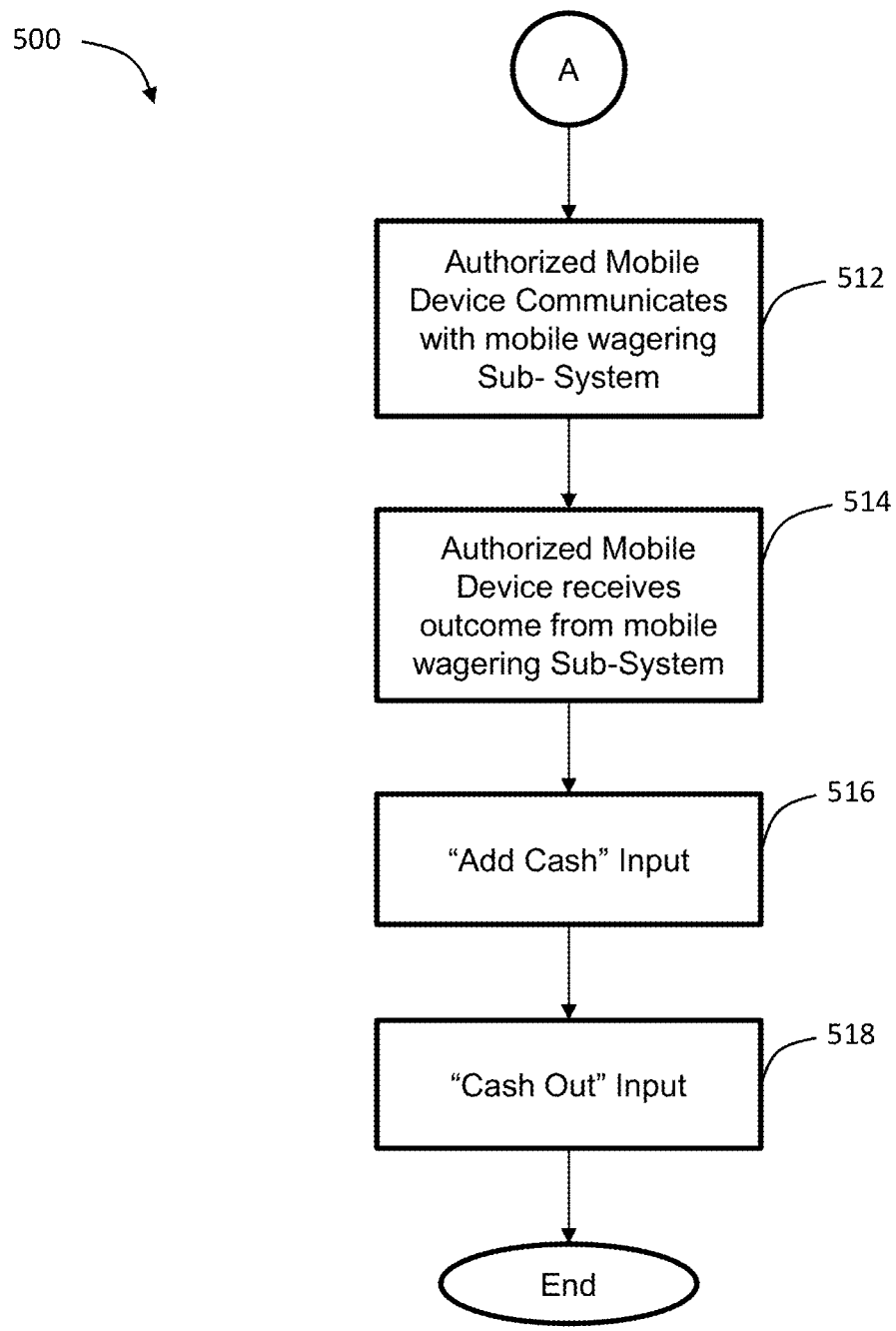

With reference to FIG. 5B, the method proceeds to block 512 where a game request is sent from the authorized mobile device 109 to the mobile wagering sub-system 60 (shown in FIG. 1). The mobile wagering sub-system 60 processes the game request. In the illustrative embodiment, the mobile wagering sub-system 60 determines a prize result and a graphic representation or representations of the prize result. Additionally, the mobile wagering sub-system 60 logs the transaction, updates database game information, and updates an accounting module to reflect the amount spent and player winnings corresponding to the game session. Furthermore, the mobile wagering sub-system 60 sends a response message or messages to the authorized mobile device specifying the information to be displayed and the new value of the player account.

The method then proceeds to block 514 where the authorized mobile device 109 receives the outcome(s) from the mobile wagering sub-system 60. For example, the authorized mobile device 109 is configured to present animations and other results associated with the game session. The authorized mobile device 109 may also include an updated accounting of total credits and the prize amounts awarded. After the game session is completed, the player can return to the game menu at any time and select a different game to play.

At block 516, the authorized mobile device receives an "Add Cash" input. By way of example, the player decides to add funds to their play amount by providing the "Add Cash" input, which alerts the cashier that the player wants to add cash to their session total. The cashier then proceeds to interact with the POS device 108 or POS App (not shown). The cashier then proceeds to enter the amount of funds to add to the authorized mobile devices and the funds are stored in the illustrative central database 314.

The "Add Cash" process operates as a cash selection input that is associated with the mobile application operating on the personal mobile device 107. The cash selection input is received by the mobile application, which is then communicated to the network component associated with the mobile wagering sub-system 60, which communicates the cash selection input to the POS device.

In the illustrative embodiment, the POS device 108 proceeds to receive a cash amount from a particular user. The POS device then proceeds to generate a confirmation instruction that confirms that the device identifier associated with the personal mobile device is in the physical possession of the particular user that provided the cash amount. The POS device 108 receives an instruction to associate the cash amount with the personal mobile device 107 that shares the same device identifier, e.g. screen name, with the personal mobile device 107 and the POS device 108. The POS communicates the cash amount, the device identifier and the session identifier to the mobile wagering sub-system 60 operating on one or more network components.

At block 518, the authorized mobile device receives a "Cash Out" input. For example, when the player has finished the game session and wants to "Cash Out" the player presses a "Cash Out" button on the authorized mobile device 109. In the illustrative embodiment, after the authorized mobile device receives the "Cash Out" input, the cashier is notified that the player desires to "Cash Out." Using the POS device 108 or the POS App, the cashier selects the "Cash Out" input and obtains the total funds remaining on the authorized mobile device after the player has completed one or more game sessions. The remaining account total information is received from the mobile wagering sub-system 60. The cashier pays the player the amount due and confirms the payment at the POS. The client device is then available for use by another player.

Figure 6A:
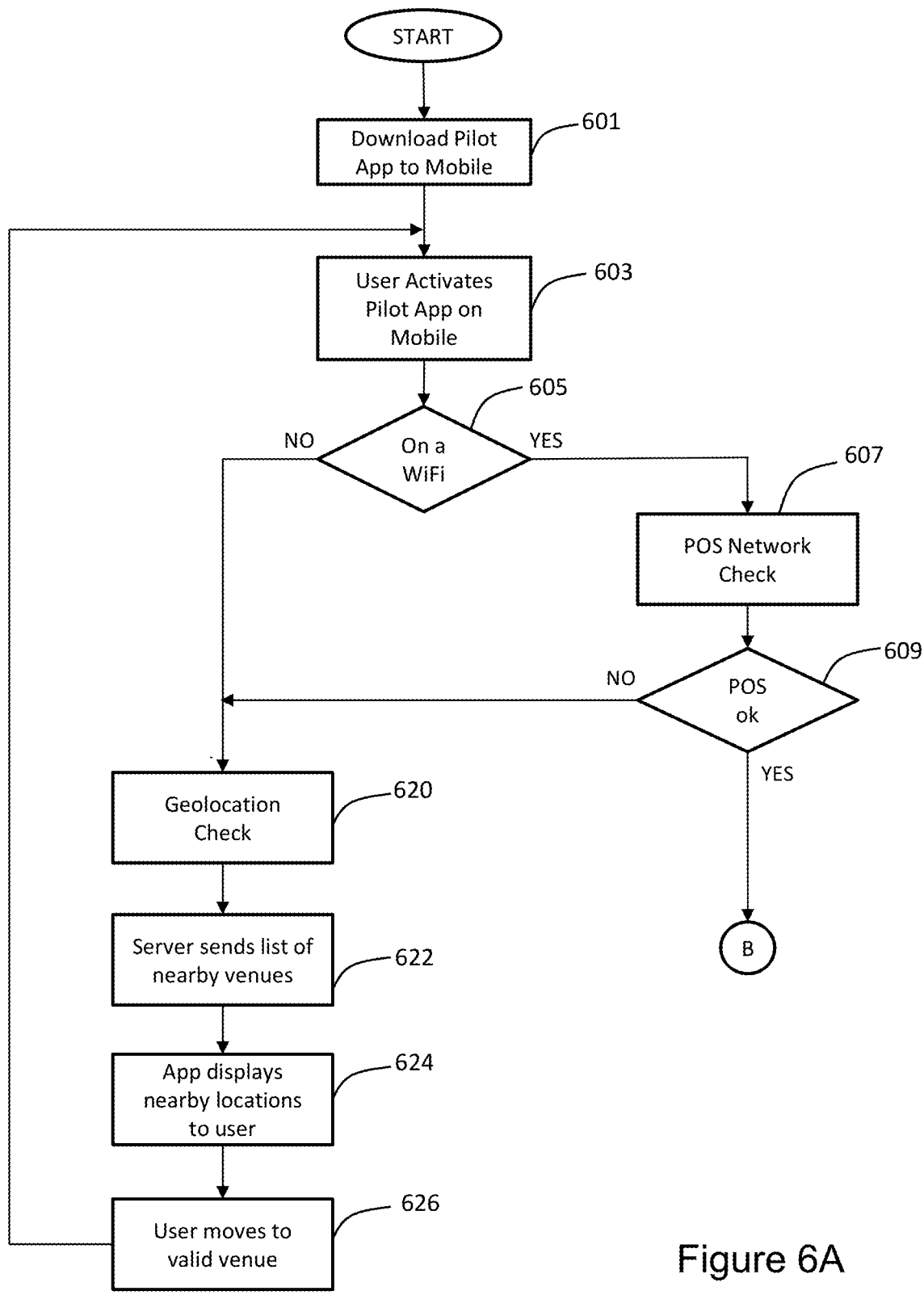
FIGS. 6A through 6D shows a more detailed method for having a user with the personal mobile device interact with the gaming system to anonymously fund an online account with cash, when the personal mobile device is located in an authorized location.

Referring now to FIG. 6A, there is shown a method for having a user with the personal mobile device 107 interact with the system 100 to anonymously fund an online account with cash.

The illustrative process is initiated at block 601 where the user downloads the illustrative mobile application from a mobile application store, i.e. a mobile "app." In the illustrative embodiment, the mobile app is called the PilotConnect Cash & Play mobile app.

At block 603, the mobile application is downloaded to the personal mobile device 107 (shown in FIG. 1) and the mobile application is opened, thereby activating the mobile application on the personal mobile device 107.

At decision diamond 605, the personal mobile device 107 determines if the personal mobile device 107 is communicating by Wi-Fi. If the personal mobile device is communicated via Wi-Fi, the method proceeds to block 607.

At block 607, the mobile application running the personal mobile device 107 attempts to communicate with a nearby POS device 108 (shown in FIG. 1) using Wi-Fi. The ability to connect to a POS indicates that the personal mobile device 107 is in an authorized location 124.

At decision diamond 609, a determination is made if the personal mobile device 107 can communicate with the nearby POS device 108 within the authorized location. If the personal mobile device 107 can communicate with the POS device, the method proceeds to circle B, which is continued in FIG. 6B.

If the personal mobile device 107 cannot communicate with the POS device, the method proceeds to block 620. At block 620, the illustrative mobile application includes an embedded function that accesses geo-location data (GL). An illustrative location-based service is Geocode.io, which accesses Global Positioning Service (GPS) satellite data collected by an agent in the mobile application that combines GPS data with other available environmental data to determine a probable location for the personal mobile device 107. The illustrative location-based service or mobile application may include a confidence factor since accuracy can be affected by a variety of factors, including weather, building obstructions, interference and other such factors. In operation, when a geo-location (GL) check is performed at block 620 the GL data calculated by the location-based service is sent to the mobile application.

At block 622, the GL data is sent by the mobile application operating on a personal mobile device 107 to the mobile wagering sub-system 60. The mobile wagering sub-system 60 is communicatively coupled to a network component that includes a database 314 with geo-location data for all authorized locations. The illustrative network component may include a server that determines a list of nearby locations that are sent from the centralized gaming system 40 to the mobile application running on the personal mobile device 107.

As block 624, authorized locations are displayed by the mobile application on the personal mobile device 107. The user interacting with the mobile application then has an opportunity, as presented in block 626, to relocate to an authorized location.

Figure 7A:
FIGS. 7A and 7B show illustrative screen shots that are sent to the user when they are interacting with the mobile application.

Referring to FIG. 7A there is shown an illustrative screenshot 720 that may be displayed on a personal mobile device 103 (shown in FIG. 1) that is located in a non-authorized or unauthorized location.

Figure 6B:
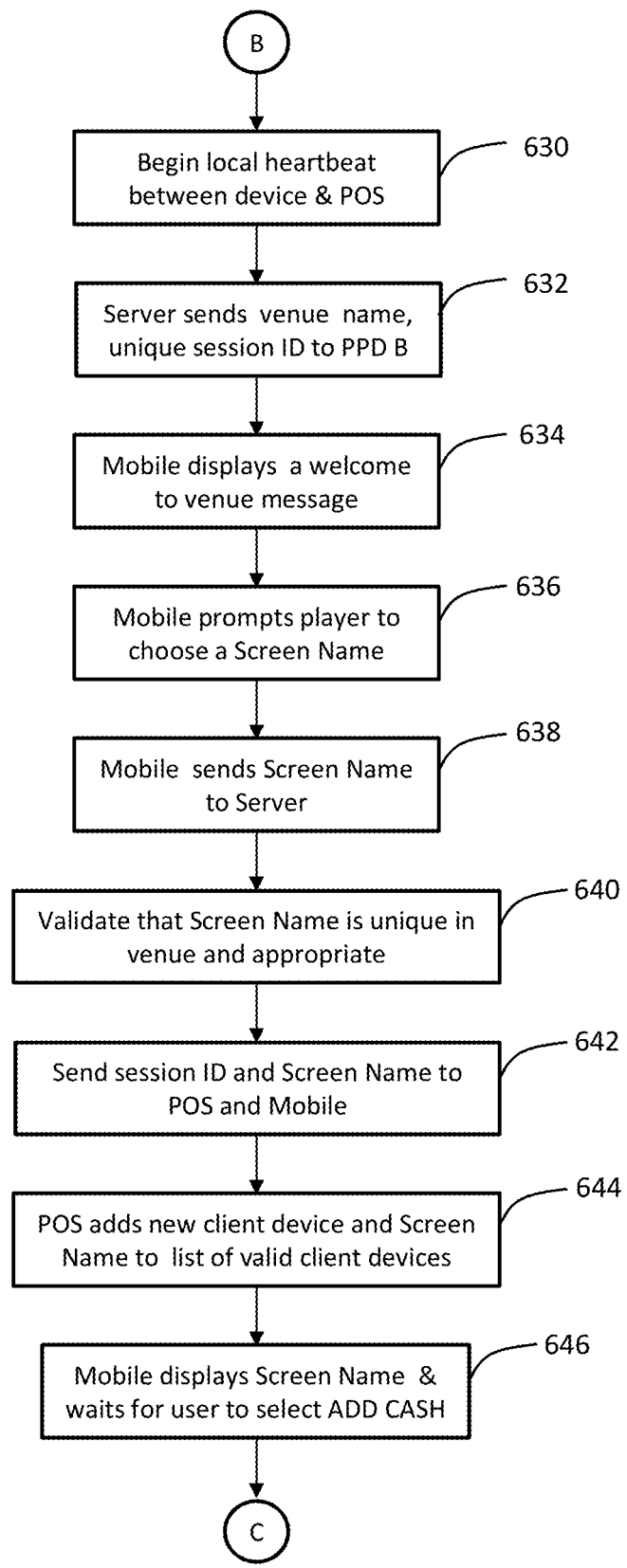

Referring now to FIG. 6B there is shown the operations performed by the illustrative personal mobile device 107 when the personal mobile device 107 is located in an authorized location.

At block 630 a heartbeat communication begins between the POS device 108 and personal mobile device 107. The heartbeat communication includes a background message protocol that requires the personal mobile device 107 to send a message to the POS device 108 periodically, e.g. once every 10 seconds. Once the personal mobile device 107 is within the authorized location, then the heartbeat communication confirms that the personal mobile device 108 is within the illustrative gaming venue. The heartbeat communication provides additional security that the personal mobile device 107 is not being operated outside the bounds of the authorized location 124. If the POS device 108 observes the loss of the heartbeat communication for a pre-defined period, the POS device 108 notifies the mobile wagering sub-system 60 that the personal mobile device 107 is no longer authorized to communicate with the mobile wagering sub-system 60.

In block 632, the mobile application running on the personal mobile device 107 receives a message from mobile wagering sub-system 60 that includes the user's authorized location, gaming venue name, and a unique session identification.

In the illustrative embodiment, the unique session identification is generated by one of the network components associated with the mobile wagering sub-system 60. The unique session identification is communicated to the personal mobile device 107. The unique session identification, generated by the network component, is also communicated to the POS device 108.

At block 634, the mobile application displays a message to the user welcoming them to the venue. An illustrative screenshot 730 presented in FIG. 7A shows the illustrative message that is sent to the user welcoming them to the venue.

At block 636, the mobile application prompts the user to choose a device identifier. By way of example and not of limitation, the device identifier is a screen name that is received by the personal mobile device 107. In one illustrative embodiment, the device identifier originates at the personal mobile device. By way of example and not of limitation, the device identifier is generated from a user input. Alternatively, the device identifier may be generated by a network component or other central gaming system component and then communicated from the network component to the personal mobile device and to the POS device. In another embodiment the user may be identified as being part of another system or database which contains a preferred device identification, e.g. screen name, which can be used provided that it complies with rules regarding uniqueness.

In an illustrative embodiment, the device identifier is a screen name having a 10 character alphanumeric field. In another embodiment, the user may enter a screen name that they have previously chosen and saved on the system with a password.

At block 638, the selected device identifier, e.g. screen name, is communicated to the central gaming system 40. At block 640, the mobile wagering sub-system 60 confirms that a chosen screen name is not active at the venue. If the chosen screen name has already in use, then the user will be advised to choose another screen name (not shown). The mobile wagering sub-system 40 also compares a chosen screen name to a list of phrases which are not acceptable. If unacceptable then the user will be advised to choose another name (not shown).

After the uniqueness of the screen name, i.e. device identifier, has been validated, the method proceeds to block 642. The unique device identification, also referred to as the screen name, along with the session identification is sent in a message to the personal mobile device 107 and the POS device 108. In the illustrative embodiment, the message includes the chosen screen name with the unique session identification. Referring to FIG. 7A, there is shown an illustrative screenshot 740 of the display screen presented on the personal mobile device 107 with the message that includes the unique screen name and unique session identification.

Referring back to FIG. 6B, at block 644 the POS device 108 adds the new client, e.g. personal mobile device 107, to the list of devices operational in the venue and the POS display may presents a list of authorized wireless devices. The method continues to block 646 where the personal mobile device 107 displays the screen name and the user chooses to initiate an "add cash" selection.

Figure 6C:
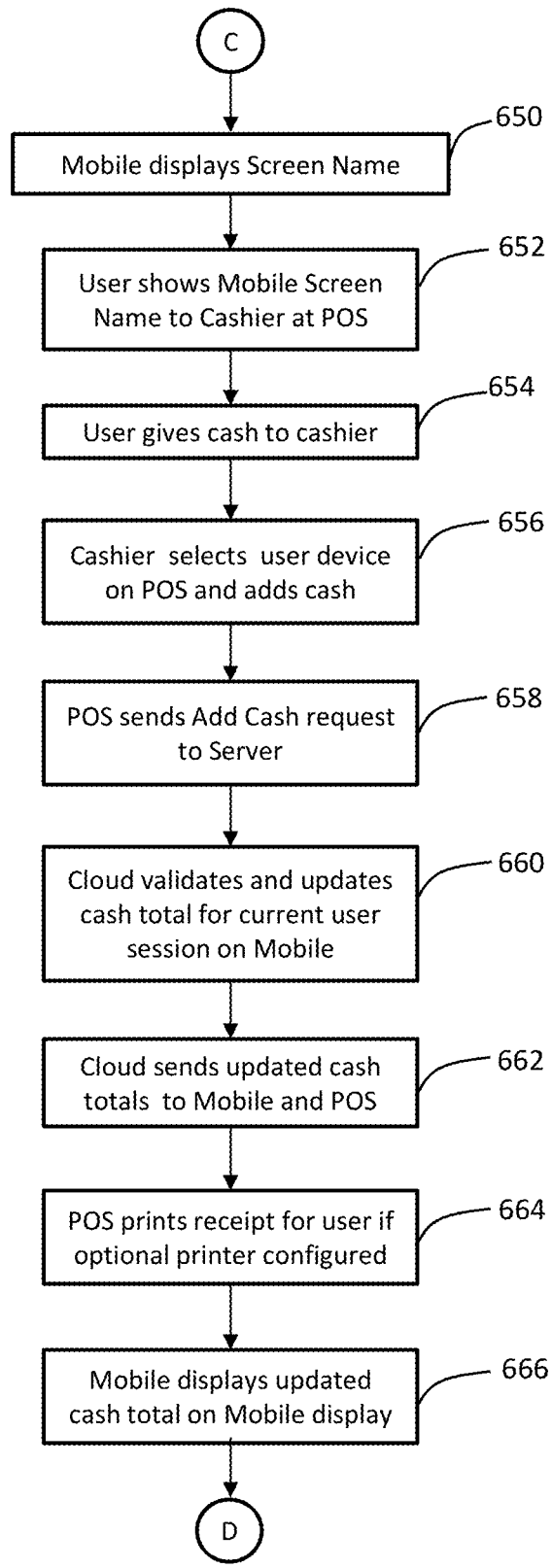

Referring now to FIG. 6C, at block 650, which is subsequent to the user selecting an option to add cash, the personal mobile device 107 displays a large image of the chosen screen name on the personal mobile device screen. An illustrative screen shot of the large image of the chosen screen name is shown as screen shot 740 in FIG. 7A.

At block 652, the user proceeds to show the chosen device identifier, e.g. screen name, to the cashier. Also, the user indicates to the cashier the amount of cash to be added. Note, the cash transaction is conducted in a relatively anonymous manner, meaning that the gaming system requires no identification, however local regulation may require showing of identification to verify age, or identification may later be required for tax purposes for large winners, etc.

At block 654, the user then tenders the indicated amount of cash to the cashier. The method then proceeds to block 656 where the cashier selects an Add Cash function on the POS device 108 and enters the amount tendered. In jurisdictions where payment for wagering is permitted in non-cash methods the funds might be tendered with credit card, debit card or other such valid instrument.

The "Add Cash" process operates as a cash selection input that is associated with the mobile application operating on the personal mobile device 107. The cash selection input is received by the mobile application, which is then communicated to the network component associated with the mobile wagering sub-system 60, which communicates the cash selection input to the POS device, which indicates the impending transaction by changing the color, or otherwise highlighting the device making a request.

The POS device 108 then proceeds to receive a cash amount. The POS device receives an instruction to associate the cash amount with the personal mobile device 107 that shares the same device identifier, e.g. screen name, with the personal mobile device and the POS device.

At block 658, the POS device 108 sends a message to the mobile wagering sub-system 60 that includes the cash amount, the session identification, the device identifier for personal mobile device 107. The method then proceeds to block 660, in which mobile wagering sub-system 60 validates the transaction by verifying the personal mobile device 107, verifying the session, and updating the cash totals for the session in one or more databases. The transaction is logged in a transaction history. If the data is invalid an error message will be returned to the POS (not shown).

The mobile wagering sub-system 60 includes one or more network components and at least one of the network components receives the device identifier (e.g. screen name), the unique session identification and the cash amount. The network component associated with the mobile wagering sub-system 60 funds the cash account 80 with the cash amount. The personal mobile device may then access the cash account 80 to fund an activity as described herein.

At block 662, the new cash total for an on-line cash account 80 is communicated to the personal mobile device 107 and the POS device 108 associated with the transaction.

The method then proceeds to block 664 where a receipt may be printed. In the illustrative embodiment, the POS device 108 includes an optional receipt printer that prints a receipt for the user showing the name and address of the venue, the device identification, the screen name, the date and time, the session identification, the amount of the cash added and the new cash total in the on-line account. At block 666, the personal mobile device 107 displays the new cash total to the user on the personal mobile device display screen.

In another embodiment the use of a screen name entered by the player is replaced by a screen name that is randomly selected by the mobile wagering sub-system 60 in a form that is easily displayable to the player and visible on the personal mobile device 107 display screen by the POS cashier. The random screen name would conform to the same requirements as the previously described player selected screen name, in that the screen name would have to be unique to the authorized location 124.

In a further embodiment, the player could be offered an opportunity to log onto an external entertainment system (not shown) with an identification and password and the Screen Name could be an item contained in the record for that player on the external system.

Figure 6D:
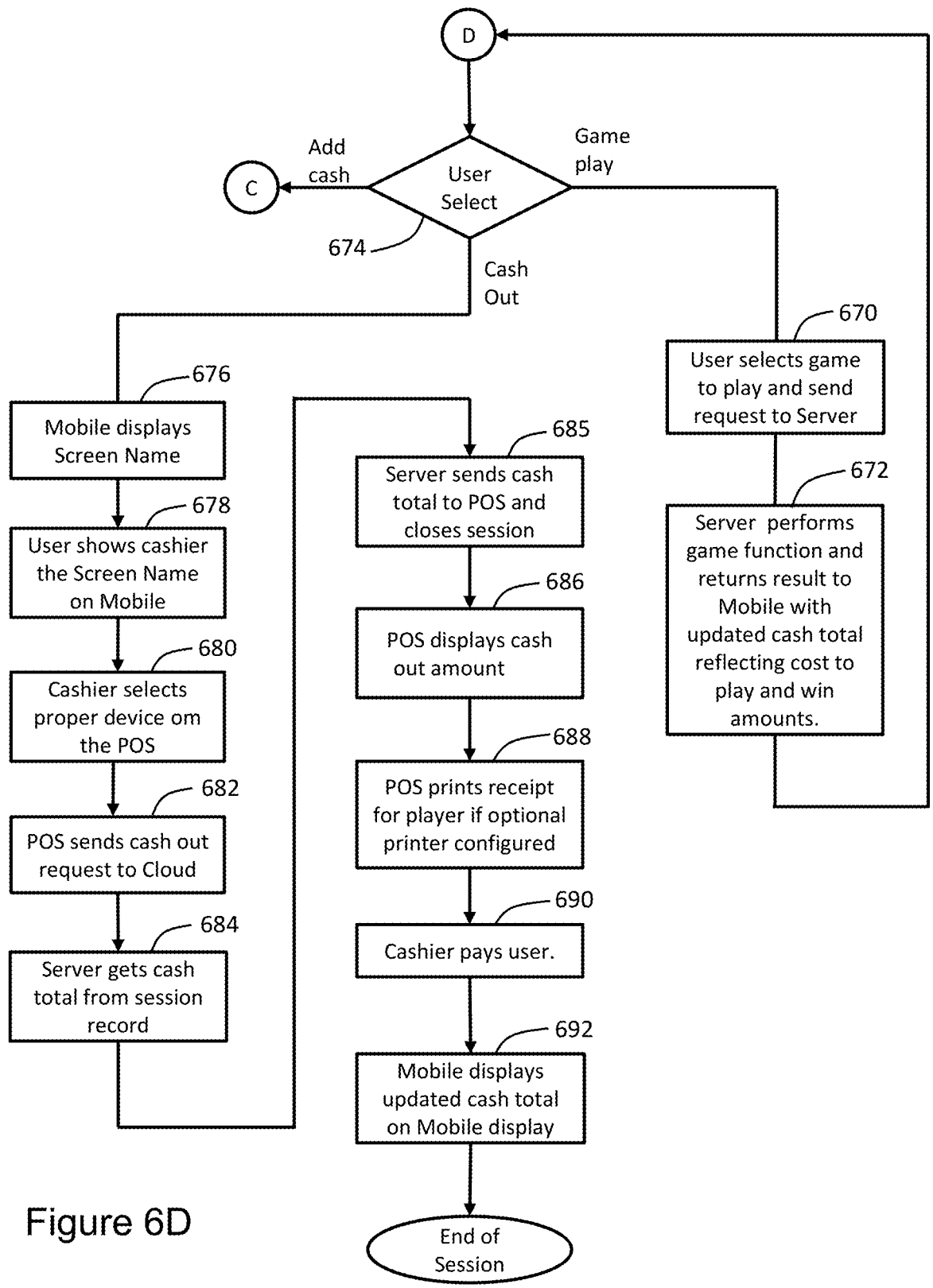

Referring now to FIG. 6D and decision diamond 674, the user of the mobile personal device 107 is presented with a menu of functions that includes an itemization of games. The user can select one of multiple functions, including, the addition of cash to the on-line account, to play a game or to cash out from the game play.

If the user selects a function to add more cash to the session total, then the method returns to circle "C" and the operations beginning at block 650 (shown in FIG. 6C) through circle "D" are performed as previously described. An illustrative screen shot of the added cash is shown as screen shot 760 in FIG. 7A.

Returning to FIG. 6D, if the user decides play a game at decision diamond 674, the method proceeds to block 670 where the user can touch a menu icon to select a game, which causes a request message to be sent from the illustrative personal mobile device 107 to the mobile wagering sub-system 60. At block 672, the mobile wagering sub-system validates the request, confirms that the user has sufficient funds in the session cash amount to play the game, and then perform the game function and debits the account by the cost of the game play. The game functions may vary considerably, depending on the type of game chosen. For example, an electronic pull-tab game is very distinct from a bingo game. Following execution of the electronic play, the mobile wagering sub-system 60 sends the results to the requesting authorized mobile client device 107 or 109. This result include a game result descriptor sufficient for the authorized mobile client device 107 or 109 to determine animation of the game for the user, as well as the amount won by the user, if any, and a new session cash total reflecting the cost of the game play and any amounts won by the player in the game. Following play of the game, the user may select a new game or function as shown in block 674. It should be noted that additional functions, such as selecting among optional denomination choices, HELP, and GAME INFORMATION may also be available choices to the user (not shown). In the case of an electronic pull-tab, or random number slot game the play sequence may be defined in a single message exchange, however in a multi-player bingo game there can be many messages involving enrollment, ball draws, declaration of wins, etc.

If the player elects to end the session and cash out at decision diamond 674, then the method proceeds to block 676. At block 676 the sequence is show that follows the user selection of a desire by the user to conclude a play session by cashing out session funds. In block 676 personal mobile device 107 displays the Screen name on the personal mobile device.

Figure 7B:
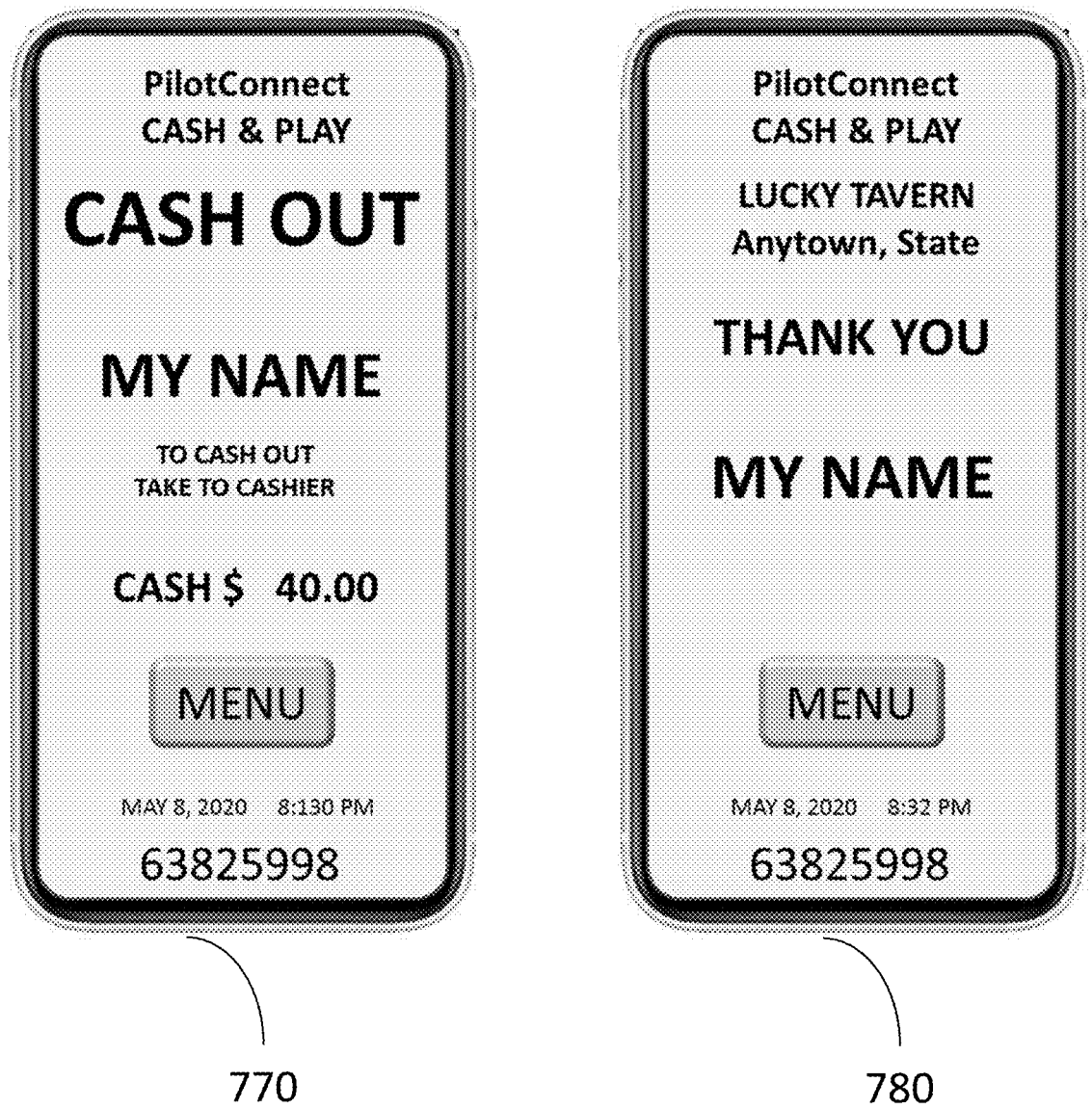

At block 678 the user shows the device identifier, e.g. screen name, display on the personal mobile device 107 to the cashier. An illustrative screen shot of the screen name for the cash out is shown as screen shot 770 in FIG. 7B.

The cashier then proceeds to inspect the screen of the POS device 108 and finds the device identifier, e.g. screen name, 420 for the personal mobile device 107 on the displayed list of active devices, as indicated by block 680. Note, the cashier can easily recognize the personal mobile device 107 because the same screen name is presented on the mobile personal device 107 and on the POS device 108. Also see items 420 and 430 in FIG. 4.

At block 682, the POS device 108 sends a cash out request message to mobile wagering sub-system 60 including the venue, the device and the screen name.

The method then proceeds to block 684 where the mobile wagering sub-system 60 uses the supplied information to retrieve the session record appropriate to the device and access the current session cash total. At block 685, the mobile wagering sub-system 60 returns the cash out amount to the initiating POS device 108 with the identifying device information closes the active session and creates a log entry in the database.

At block 686 the POS device 108 displays the cash amount. If an optional receipt printer is associated with the POS device 108, a receipt is printed for the user as indicated by block 688. The illustrative receipt includes the venue name and address, the date and time, the device identification, amount redeemed and screen name.

At block 690 the cashier will pay the user. The personal mobile device then proceeds to display the updated cash total as indicated by block 692. An illustrative screen shot of the completed cash out is presented as a "thank-you" screen shot 780 in FIG. 7B.

The system and method described above relate to the funding of wagering activity on a software application, e.g. a mobile application, on a user's personal device. Many mechanisms are available for funding wagering activity using debit cards or credit cards, or other private account. The systems and method support wagering activity that is only allowable within geographic boundaries of specified venues. The systems and methods described above allow the payment of cash by an anonymous user by defining an interaction between a user with a personal device and a POS device at a location authorized or licensed to offer wagering on mobile devices.

It should be noted that in jurisdictions that allow gaming outside of physically licensed areas some of the above-mentioned security considerations may be relaxed or replaced by more appropriate mechanisms. It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for anonymously funding a temporary cash account, the system comprising:
- a personal mobile device communicatively coupled to a network component that includes a mobile wagering sub-system;
- a cash account managed by the mobile wagering sub-system, in which the cash account has a predefined duration period, in which the cash account forfeits funds remaining in the cash account upon expiration of the predefined duration period;
- a list of authorized gaming venue locations stored at the network component;
- wherein the personal mobile device is converted to an authorized mobile device when the personal mobile device is within an authorized gaming venue location;
- a Point-of-Sale (POS) device communicatively coupled to the network component and the mobile wagering sub-system, wherein the POS device is associated with the at least one authorized gaming venue location;
- an authorized POS device having the POS device registered with the mobile wagering sub-system, wherein the authorized POS device is associated with the authorized gaming venue location;
- a device identifier received by the authorized mobile device when the authorized mobile device is within the authorized gaming venue location, in which the device identifier is communicated from the network component to the authorized mobile device and to the authorized POS device at the authorized gaming venue location;
- a unique session identification, generated by the network component, is communicated to the authorized mobile device;
- the unique session identification generated by the network component is communicated to the authorized POS device;
- the authorized POS device receives a cash amount from a particular user;
- the authorized mobile device displays the device identifier on the screen of the authorized mobile device;
- the authorized POS device generates a confirmation instruction that confirms that the device identifier associated with the authorized mobile device is in the physical possession of the particular user that provided the cash amount;
- the authorized POS receives an instruction to associate the cash amount with the authorized mobile device sharing the same device identifier with the authorized mobile device and the POS device;
- the authorized POS device communicates the device identifier, the unique session identification and the cash amount to the network component;
- the network component receives the device identifier, the unique session identification and the cash amount;
- the network component verifies the received data and funds the cash account with the cash amount; and
- the authorized mobile device accesses the cash account to fund an activity.

2. The system of claim 1 further comprising a mobile application that is downloaded to the authorized mobile device wherein the downloaded mobile application is communicatively coupled to the network component.

3. The system of claim 1 wherein the network component receives a Wi-Fi source message from the mobile application, in which the Wi-Fi source message is associated with an authorized location.

4. The system of claim 2 wherein the mobile application requests a geo-location data set and the mobile application communicates the geo-location data set to the network component.

5. The system of claim 4 wherein the network component accesses a database that identifies authorized locations.

6. The system of claim 1 further comprising a cash selection input associated with a mobile application, in which the cash selection input is received by the mobile application; and
- the cash selection input is communicated to the network component, which then communicates the cash selection input to the POS device.

7. The system of claim 1 further comprising a mobile application that includes a wagering game operating on the authorized mobile device and the cash account funds the wagering game.

8. The system of claim 1 further comprising a mobile application associated with the authorized mobile device that receives the device identifier and the mobile application receives the unique session identification.

9. The system of claim 1 further comprising a mobile application displaying the device identifier with a large image of the device identifier when the authorized mobile device is in the same authorized location as the POS device.

10. A system for anonymously funding a temporary cash account, the system comprising:
- a personal mobile device communicatively coupled to a network component that includes a mobile wagering sub-system;
- a mobile application that is downloaded to the personal mobile device wherein the downloaded mobile application is communicatively coupled to the network component;
- a geo-location data set requested by the mobile application and communicated by the mobile application to the network component;
- the network component communicating a list of authorized gaming venue locations to the mobile application;
- a cash account managed by the mobile wagering sub-system, in which the cash account has a predefined duration period, in which the cash account forfeits funds remaining in the cash account upon expiration of the predefined duration period;
- a list of authorized gaming venue locations;
- wherein the personal mobile device is converted to an authorized mobile device when the personal mobile device is within an authorized gaming venue location;
- a Point-of-Sale (POS) device communicatively coupled to the network component and the mobile wagering sub-system, wherein the POS device is associated with at least one authorized gaming venue location;
- an authorized POS device having the POS device registered with the mobile wagering sub-system, wherein the authorized POS device is associated with the authorized gaming venue location;
- a device identifier received by the authorized mobile device when the authorized mobile device is within the authorized gaming venue location, in which the device identifier is communicated from the network component to the authorized mobile device and to the authorized POS device at the authorized gaming venue location;
- a unique session identification, generated by the network component, is communicated to the authorized mobile device;

the unique session identification generated by the network component is also communicated to the authorized POS device;

the authorized POS device displays the device identifier;

the device identifier is displayed on the authorized mobile device when the authorized mobile device is in a same authorized location as the authorized POS device;

the authorized POS device receives a cash amount from a particular user;

the authorized POS device generates a confirmation instruction that confirms that the device identifier associated with the authorized mobile device is in the physical possession of the particular user that provided the cash amount;

the authorized POS receives an instruction to associate the cash amount with the authorized mobile device sharing the same device identifier with the authorized mobile device and the authorized POS device;

the authorized POS device communicates the cash amount to the network component;

the network component receives the device identifier, the unique session identification and the cash amount;

the network component funds the cash account with the cash amount; and the authorized mobile device accesses the cash account to fund a gaming activity.

11. The system of claim 10 further comprising a cash selection input associated with the mobile application, in which the cash selection input is received by the mobile application; and the cash selection input communicated to the network component, which then communicates the cash selection input to the authorized POS device.

12. The system of claim 10 wherein the mobile application displays the device identifier with a large image of the device identifier when the authorized mobile device is in the same authorized location as the authorized POS device.

13. A method for anonymously funding a temporary cash account, the system comprising:

communicatively coupling a personal mobile device to a network component that includes a mobile wagering sub-system;

providing a cash account managed by the mobile wagering sub-system, in which the cash account has a predefined duration period, in which the cash account forfeits funds remaining in the cash account upon expiration of the predefined duration period;

generating a list of authorized gaming venue locations that are stored at the network component;

converting the personal mobile device to an authorized mobile device when the personal mobile device is within an authorized gaming venue location;

communicatively coupling a Point-of-Sale (POS) device to the network component and mobile wagering sub-system, wherein the POS device is associated with at least one authorized gaming venue location;

converting the POS device to an authorized POS device when the POS device is registered with the mobile wagering sub-system and the authorized POS device is associated with the authorized gaming venue location;

receiving, by the authorized mobile device, a device identifier in which the device identifier is communicated from the network component to the authorized mobile device and to the authorized POS device, when the authorized mobile device is within the authorized gaming venue location;

generating, by the network component, a unique session identification that is communicated to the authorized mobile device;

communicating the unique session identification, generated by the network component, to the authorized POS device;

displaying the device identifier on the authorized POS device;

displaying the device identifier on the screen of the authorized mobile device when the authorized mobile device is in a same authorized location the authorized POS device;

receiving a cash amount at the authorized POS device from a particular user;

generating a confirmation instruction, by the authorized POS device, that confirms that the device identifier associated with the authorized mobile device is in the physical possession of the particular user that provided the cash amount;

receiving, at the authorized POS, an instruction to associate the cash amount with the authorized mobile device sharing the same device identifier with the authorized mobile device and the authorized POS device;

communicating the cash amount from the authorized POS device to the network component;

enabling the network component to receive the device identifier, the unique session identification, and the cash amount;

funding the cash account, at the network component, with the cash amount; and enabling the authorized mobile device to access with the cash account to fund an activity.

14. The method of claim 13 further comprising, downloading a mobile application to the authorized mobile device wherein the downloaded mobile application is communicatively coupled to the network component;

requesting a geo-location data set, by the mobile application, that is communicated from the mobile application to the network component; and communicating, by the network component, a list of authorized gaming locations to the mobile application.

15. The method of claim 13 further comprising providing a cash selection input associated with the mobile application, in which the cash selection input is received by the mobile application and communicated to the network component, which then communicates the cash selection input to the authorized POS device.

16. The method of claim 13 wherein the mobile application displays the device identifier with a large image of the device identifier when the authorized mobile device is in the same authorized location as the authorized POS device.

* * * * *